US009979781B2

(12) United States Patent
Kitazato

(10) Patent No.: US 9,979,781 B2
(45) Date of Patent: May 22, 2018

(54) RECEIVING DEVICE, RECEIVING METHOD, TRANSMISSION DEVICE, TRANSMISSION METHOD, AND PROGRAM

(71) Applicant: SATURN LICENSING LLC, New York, NY (US)

(72) Inventor: Naohisa Kitazato, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 270 days.

(21) Appl. No.: 14/646,827

(22) PCT Filed: Nov. 18, 2013

(86) PCT No.: PCT/JP2013/080979
§ 371 (c)(1),
(2) Date: May 22, 2015

(87) PCT Pub. No.: WO2014/084073
PCT Pub. Date: Jun. 5, 2014

(65) Prior Publication Data
US 2015/0296005 A1    Oct. 15, 2015

(30) Foreign Application Priority Data

Nov. 29, 2012  (JP) ................................. 2012-260628

(51) Int. Cl.
*G06F 15/16* (2006.01)
*H04L 29/08* (2006.01)
(Continued)

(52) U.S. Cl.
CPC ...... *H04L 67/104* (2013.01); *G06F 17/30206* (2013.01); *H04H 20/16* (2013.01);
(Continued)

(58) Field of Classification Search
CPC .... H04L 67/02; H04L 67/18; G06F 17/30876
(Continued)

(56) References Cited

U.S. PATENT DOCUMENTS 6,966,065 B1 * 11/2005 Kitazato ................. H04L 12/18
348/705
7,730,155 B1 *  6/2010 Meyer .................... H04W 4/02
709/201

FOREIGN PATENT DOCUMENTS

JP    2003-122771 A    4/2003
JP    2005-210244 A    8/2005
(Continued)

OTHER PUBLICATIONS

International Search Report dated Feb. 10, 2014 in PCT/JP2013/080979 (with English language translation).

*Primary Examiner* — Wing F. Chan
*Assistant Examiner* — Andrew Woo
(74) *Attorney, Agent, or Firm* — Oblon, McClelland, Maier & Neustadt, L.L.P.

(57) ABSTRACT

The present technology relates to a receiving device, a receiving method, a transmission device, a transmission method, and a program, which allow an application program to be created in an optimum production environment. An AIT acquisition and analysis unit acquires mapping information in which a first directory structure, to be used in the case of transmitting a resource constituting an application program by a first transmission system, and a second directory structure, to be used in the case of transmitting a resource constituting the application program by a second transmission system, are associated with each other. When an application program including a resource created in accordance with the first directory structure is transmitted by the second transmission system, a carousel processing unit allows the resource created in accordance with the first
(Continued)

directory structure to correspond to the second directory structure using the mapping information to thereby acquire the application program transmitted by the second transmission system. The present technology is applicable to television receiver, for example.

19 Claims, 20 Drawing Sheets

(51) Int. Cl.
    *H04H 20/16*     (2008.01)
    *H04H 20/91*     (2008.01)
    *H04N 21/231*     (2011.01)
    *H04N 21/236*     (2011.01)
    *H04N 21/8543*     (2011.01)
    *G06F 17/30*     (2006.01)
    *H04L 29/06*     (2006.01)

(52) U.S. Cl.
    CPC ............. *H04H 20/91* (2013.01); *H04L 65/00* (2013.01); *H04N 21/23109* (2013.01); *H04N 21/23617* (2013.01); *H04N 21/8543* (2013.01)

(58) Field of Classification Search
    USPC ........................................................ 709/217
    See application file for complete search history.

(56) References Cited

FOREIGN PATENT DOCUMENTS

| | | |
|---|---|---|
| JP | 2008-011069 A | 1/2008 |
| JP | 2009-199459 A | 9/2009 |
| JP | 2010-178190 A | 8/2010 |
| JP | 2011-259357 A | 12/2011 |

* cited by examiner

FIG. 5
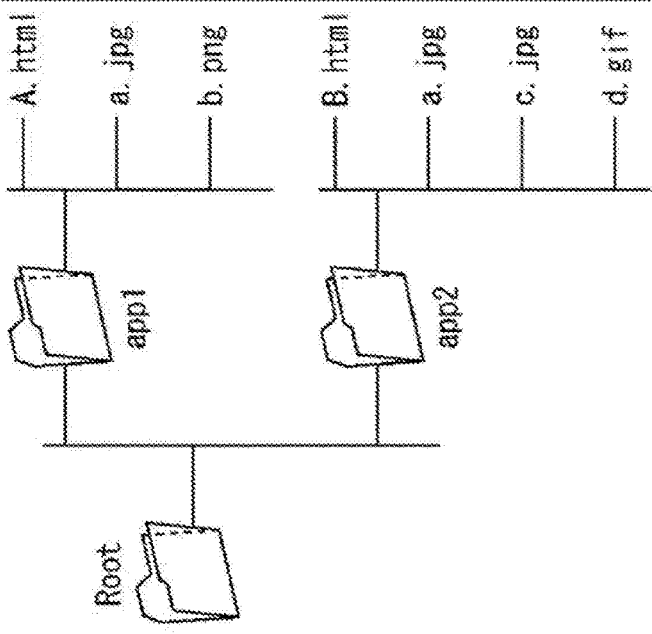
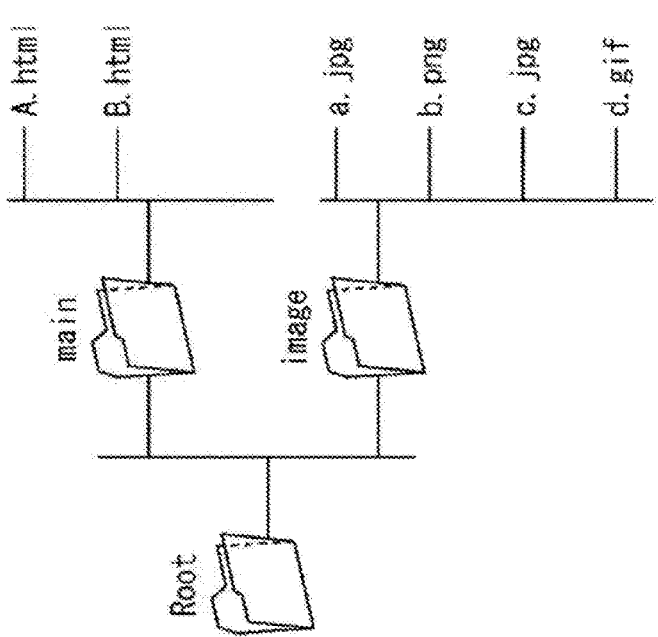

TRANSPORT PROTOCOL DESCRIPTOR

| DATA STRUCTURE | NUMBER OF BITS | BIT STREAM PLACEMENT |
|---|---|---|
| transport_protocol_descriptor () { | | |
|   descriptor_tag | 8 | uimsbf |
|   descriptor_length | 8 | uimsbf |
|   protocol_id | 16 | uimsbf |
|   transport_protocol_label | 8 | uimsbf |
|   for (i=0; i<N; i++) { | | |
|     selector_byte | 8 | uimsbf |
|   } | | |
| } | | |

FIG. 10

("SELECTOR_BYTE" IN FIG. 9 FOR TRANSPORT PROTOCOL DESCRIPTOR 1714a)

SELECTOR BYTE IN DATA CAROUSEL TRANSMISSION 2010

| DATA STRUCTURE | NUMBER OF BITS | BIT STREAM PLACEMENT |
|---|---|---|
| remote_connection | 1 | bslbf |
| reserved_future_use | 7 | bslbf |
| If(remote_connection=="1"){ | | |
| original_network_id | 16 | uimsbf |
| transport_stream_id | 16 | uimsbf |
| service_id | 16 | uimsbf |
| } | | |
| component_tag | 8 | uimsbf |
| } | | |

*FIG. 11*

("SELECTOR_BYTE" IN FIG. 9 FOR TRANSPORT PROTOCOL DESCRIPTOR 1714b) 2110

SELECTOR BYTE IN HTTP/HTTPS

| DATA STRUCTURE | NUMBER OF BITS | BIT STREAM PLACEMENT |
|---|---|---|
| for (i=0;i<N;i++) { | | |
|   URL_base_length | 8 | uimsbf |
|   for (j=0;j<N,j++) { | | |
|     URL_base_byte | 8 | uimsbf |
|   } | | |
|   URL_extension_count | 8 | uimsbf |
|   for (j=0;j<URL_extension_count;j++) { | | |
|     URL_extension_length | 8 | uimsbf |
|     for (k=0;k<URL_extension_length;k++) { | | |
|       URL_extension_byte | 8 | uimsbf |
|     } | | |
|   } | | |
| } | | |

FIG. 12

(EXAMPLE CAROUSEL MAPPING DESCRIPTOR 1718 IN FIG. 7)
2210

CAROUSEL MAPPING DESCRIPTOR

| DATA STRUCTURE | NUMBER OF BITS | BIT STREAM PLACEMENT |
|---|---|---|
| carousel_mapping_descriptor () { | | |
| descriptor_tag | 8 | uimsbf |
| descriptor_length | 8 | uimsbf |
| number_of_modules | 8 | uimsbf |
| for(i=0;i<number_of_modules;i++) { | 8 | uimsbf |
| module_id | 16 | |
| number_of_resources | 8 | uimsbf |
| for (j=0;j<number_of_resources;j++) { | | |
| URL_length | 8 | |
| for (k=0;k<URL_length;k++) { | | |
| URL_data_byte | 8 | |
| } | | |
| } | | |
| } | | |

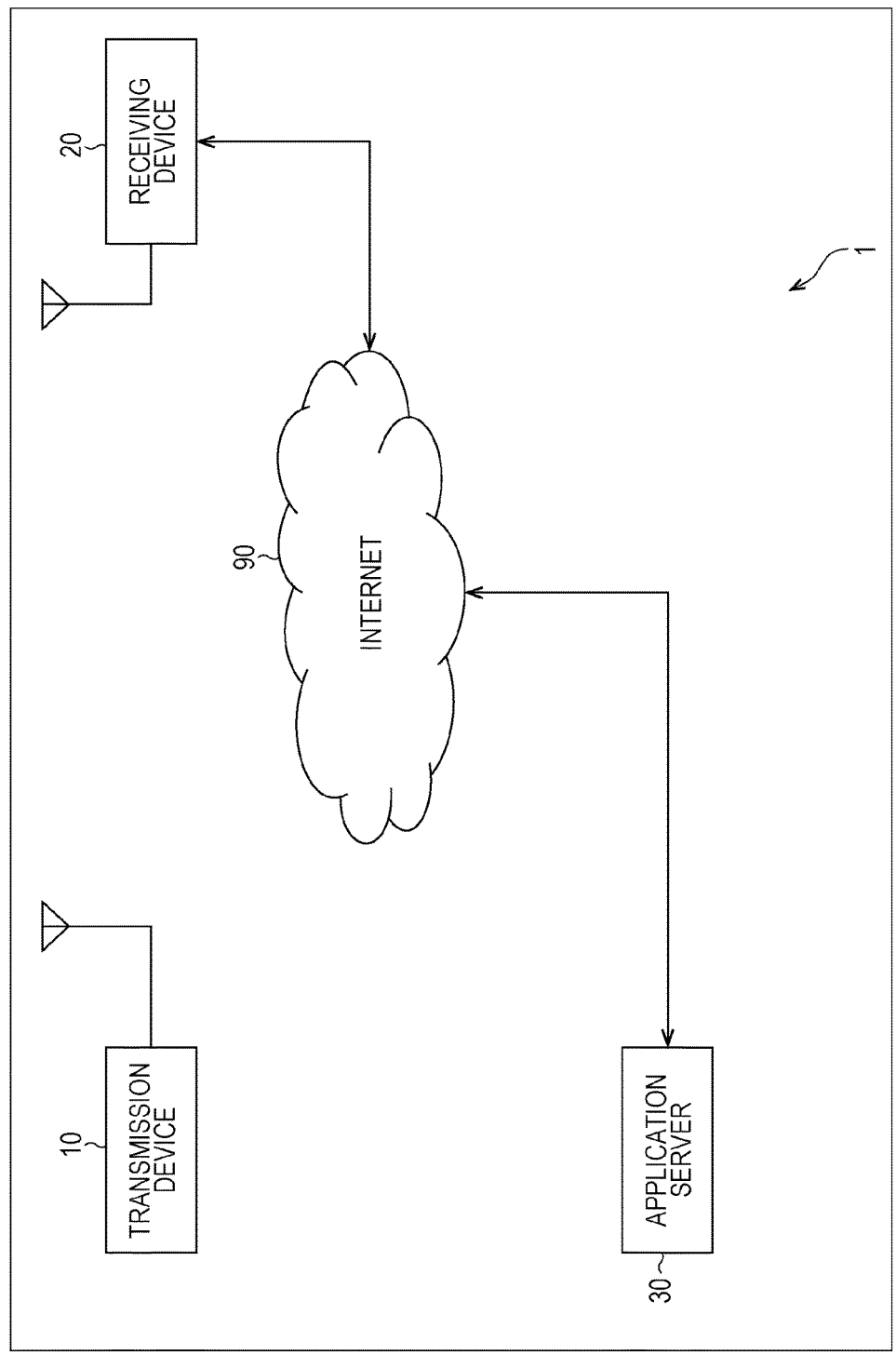

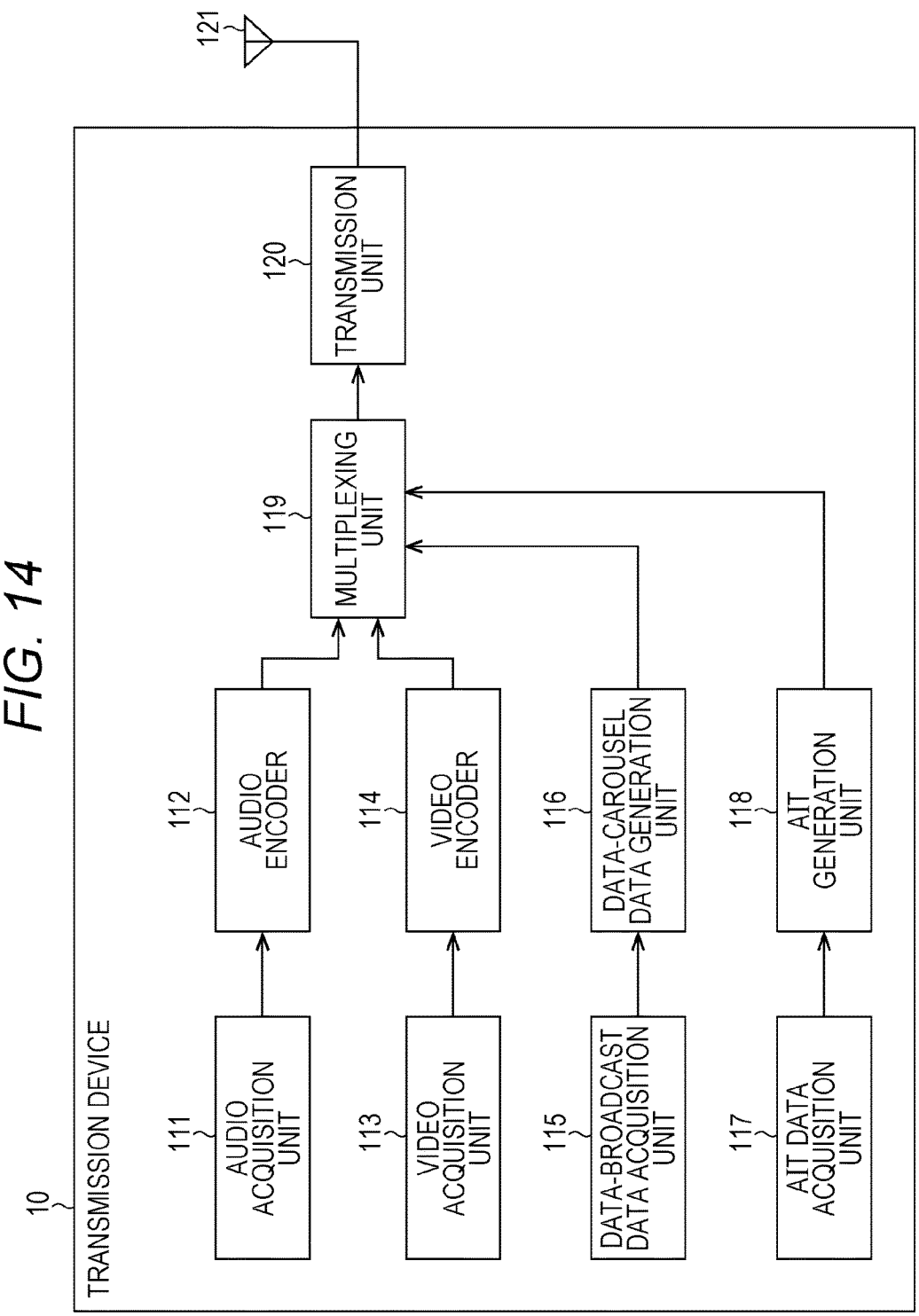

RECEIVING DEVICE, RECEIVING METHOD, TRANSMISSION DEVICE, TRANSMISSION METHOD, AND PROGRAM

TECHNICAL FIELD

The present invention relates to a receiving device, a receiving method, a transmission device, a transmission method, and a program. In particular, the present invention relates to a receiving device, a receiving method, a transmission device, a transmission method, and a program, which allow an application program to be created in an optimum production environment.

BACKGROUND ART

In general, an application program transmitted over the Internet (hereinafter referred to as a web application) is configured of HTML (HyperText Markup Language) files, image files, and the like (for example, see Patent Document 1).

As illustrated in FIG. 1, in a production environment of a web application (1100), it is typical that in the lower-order layer of a particular folder such as "Root" (1110), folders according to the producer's convenience such as "main" (1120), "image" (1130) and the like are created, and resources necessary for such folders are placed therein. In the example of FIG. 1, HTML document files such as A.html (1122) and B.html (1124) are placed in the main folder (1120), which is in the lower-order layer of the root folder (1110) and image files such as a.jpg (1132), b.png (1134), c.jpg (1136), and d.gif (1138) are placed in the image folder (1130).

As such a hierarchical structure is provided, resource reference in HTML documents is often described by a relative path based on the premise of the directory structure of FIG. 1, as illustrated in FIG. 2. FIG. 2 illustrates an exemplary description of a relative path (1210) in the case of referring to a.jpg (1132) laced in the image folder (1130) from A.html (1122) placed in the main folder (1120).

The web application (1100) created in this manner is uploaded to an application server connected with the Internet in a state of maintaining the directory structure of FIG. 1, and is supplied to a receiver.

On the other hand, an application program transmitted by data carousel transmission (hereinafter referred to as a data broadcast application), used in data broadcasting, is configured of BML (Broadcast Markup Language) files, image files, and the like (for example, see Patent Document 2). There is also a case where HTML document files are used instead of BML document files.

As illustrated in FIG. 3, in the production environment of a data broadcast application (1300), it is necessary to create folders in module units such as "app1" (1320) and "app2" (1330) in the lower-class layer of a particular folder such as "Root" (1310), and to place resources together for each acquisition unit in those folders, depending on the structure of transmission data. In the example of FIG. 3, A.html (1122), a.jpg (1132), and b.png (1134) are placed in the app1 folder (1320), and B.html (1124), a.jpg (1132), c.jpg (1136), and d.gif (1138) are placed in the app2 folder (1330).

As such, as illustrated in FIG. 4, in data carousel transmission (1400), two types of messages are mainly used, namely DDB (Download Data Block) including real data of a data broadcast application, and DII (Download Info Indication) storing directory information of DDB.

DII indicates index information to be transmitted within the data carousel. Further, information of a plurality of modules can be described in one DII. When a receiver receives the DII, it recognizes the structure of a module. In the DII (1410) of FIG. 4, information such as module id 1412 and module name (4141) is described for each of the modules m1, m2, ..., mk (1410-1, 1410-2, ... 1410-$k$, k=1 to n).

DDB corresponds to each block of a module. The DDB (1420) of FIG. 4 is configured such that RL (Resource List, 1420-1), in which names of resources stored in the module such as A.html (1422), a.jpg (1424), and b.png (1426) are listed, is placed following the header information. Further, real data of A.html (1420-2), a.jpg (1420-3), and b.png (1420-4) are placed following the RL (1420-1).

As schematically illustrated in FIG. 4, as the modules in blocks are transmitted cyclically by data carousel transmission, a receiver obtains DDB based on the DII and reconstructs the target module.

It should be noted that the transmission sequence of DDB and DII is arbitrary. However, as DII stores data equivalent to index information, it is transmitted at relatively high frequency.

CITATION LIST

Patent Document

Patent Document 1: Japanese Patent Application Laid-Open No. 2003-122771
Patent Document 2: Japanese Patent Application Laid-Open No. 2005-210244

SUMMARY OF THE INVENTION

Problems to be Solved by the Invention

Meanwhile, from the viewpoint of a producer, while it is necessary to place resources in the directory structure of FIG. 1 in the case of creating a web application, it is necessary to place resources in the directory structure of FIG. 3 in the case of creating a data broadcast application. As such, positions of resources which should be placed in folders having a hierarchical structure differ from each other.

As such, when a producer of a web application creates a data broadcast application, it is necessary to create a data broadcast application in a hierarchical structure considering modules which serve as resource acquisition units in data carousel transmission. However, as a web application creator is used to a production environment of a web application, there is a request for creating a data broadcast application in the same production environment as that of a web application.

The present technology has been made in view of such a situation, which enables creation of an application program in an optimum production environment.

Solutions to Problems

A receiving device according to a first aspect of the present technology includes: a receiving unit that receives AV content; a mapping information acquisition unit that acquires mapping information in which a first directory structure and a second directory structure are associated with each other, the first directory structure being used in a case of transmitting, by a first transmission system, a resource constituting an application program executed in conjunction with the AV content, the second directory structure being used in a case of transmitting a resource constituting the application program by a second transmission system; and an application acquisition unit that, when the application program including a resource created in accordance with the first directory structure is transmitted by the second transmission system, allows the resource created in accordance with the first directory structure to correspond to the second directory structure using the mapping information to thereby acquire the application program transmitted by the second transmission system.

The mapping information is included in control information for controlling operation of the application program, and the receiving device further includes a control unit that controls the operation of the application program based on the control information.

The first transmission system is transmission by communications using the Internet, the first directory structure has a hierarchical structure used in a production environment of an application program for transmission by communications, the second transmission system is transmission by broadcasting using data carousel transmission, and the second directory structure has a hierarchical structure used in a production environment of an application program for transmission by broadcasting.

In the first directory structure, a resource is designated by a relative path which is relative to a particular path, and the mapping information associates the resource designated by the relative path with a resource stored in a module used in data carousel transmission.

When the application acquisition unit allows a resource created in accordance with the first directory structure to correspond to the second directory structure using the mapping information, when there are resources of the same name, the application acquisition unit preferentially selects a resource stored in a module being referred to.

The application acquisition unit acquires the application program to be transmitted by a transmission system of either communications or broadcasting, in accordance with information representing a transmission system included in the control information.

The control information is transmitted by a transmission system of either communications or broadcasting.

When the application program including a resource created in accordance with the second directory structure is transmitted by the second transmission system, the application acquisition unit acquires the application program transmitted by the second transmission system without using the mapping information.

The receiving device may be an independent device or an inner block constituting a device.

A receiving method or a program according to the first aspect of the present technology is a receiving method or a program corresponding to the receiving device according to the first aspect of the present technology.

In the receiving device, the receiving method, and the program according to the first aspect of the present technology, AV content is received, mapping information is acquired in which a first directory structure to be used in the case of transmitting, by a first transmission system, a resource constituting an application program executed in conjunction with the AV content, and a second directory structure to be used in the case of transmitting a resource constituting the application program by a second transmission system, are associated with each other, and when the application program including a resource created in accordance with the first directory structure is transmitted by the second transmission system, the resource created in accordance with the first directory structure is allowed to correspond to the second directory structure with use of the mapping information, whereby the application program transmitted by the second transmission system is acquired.

A transmission device according to a second aspect of the present technology includes a generation unit that generates control information for controlling operation of an application program executed in conjunction with AV content, and a transmission unit that transmits the control information along with the AV content. The control information includes mapping information in which a first directory structure to be used in the case of transmitting a resource constituting the application program by a first transmission system, and a second directory structure to be used in the case of transmitting a resource constituting the application program by a second transmission system, are associated with each other.

The transmission device may be an independent device or an inner block constituting a device.

A transmission method or a program according to the second aspect of the present technology is a transmission method or a program corresponding to the transmission device according to the second aspect of the present technology.

In the transmission device, transmission method, and the program according to the second aspect of the present technology, control information for controlling operation of an application program executed in conjunction with AV content is generated, and the control information is transmitted along with the AV content. Further, the control information includes mapping information in which a first directory structure to be used in the case of transmitting a resource constituting the application program by a first transmission system, and a second directory structure to be used in the case of transmitting a resource constituting the application program by a second transmission system, are associated with each other.

Effects of the Invention

According to a first aspect and a second aspect of the present technology, it is possible to create an application program in an optimum production environment.

BRIEF DESCRIPTION OF DRAWINGS

FIG. 5 is a drawing for explaining the concept of the present technology.

FIG. 9 is a drawing illustrating a data structure of a transport protocol descriptor.

FIG. 10 is a drawing illustrating a data structure of selector byte in the case of data carousel transmission.

FIG. 11 is a drawing illustrating a data structure of a selector byte in the case of communication transmission by HTTP or HTTPS.

FIG. 12 is a drawing illustrating a data structure of a carousel mapping descriptor.

FIG. 13 is a drawing illustrating a configuration of an embodiment of a broadcast/communication cooperation system to which the present technology is applied.

FIG. 14 is a drawing illustrating a configuration of an embodiment of a transmission device to which the present technology is applied.

MODE FOR CARRYING OUT THE INVENTION

Figure 1:
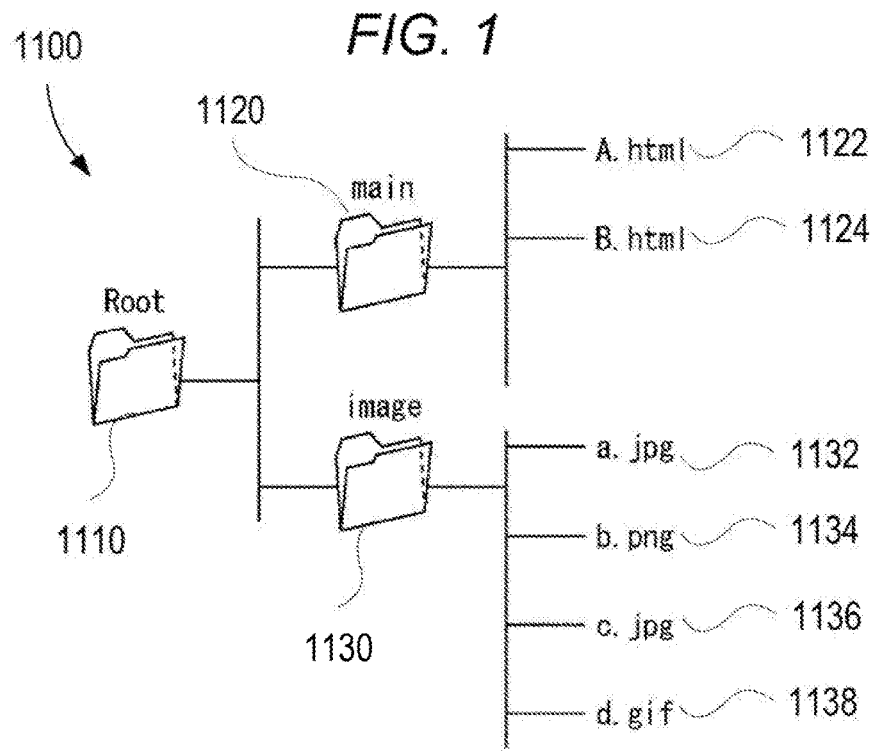
FIG. 1 is a drawing illustrating a directory structure in a web application production environment.
Figure 2:
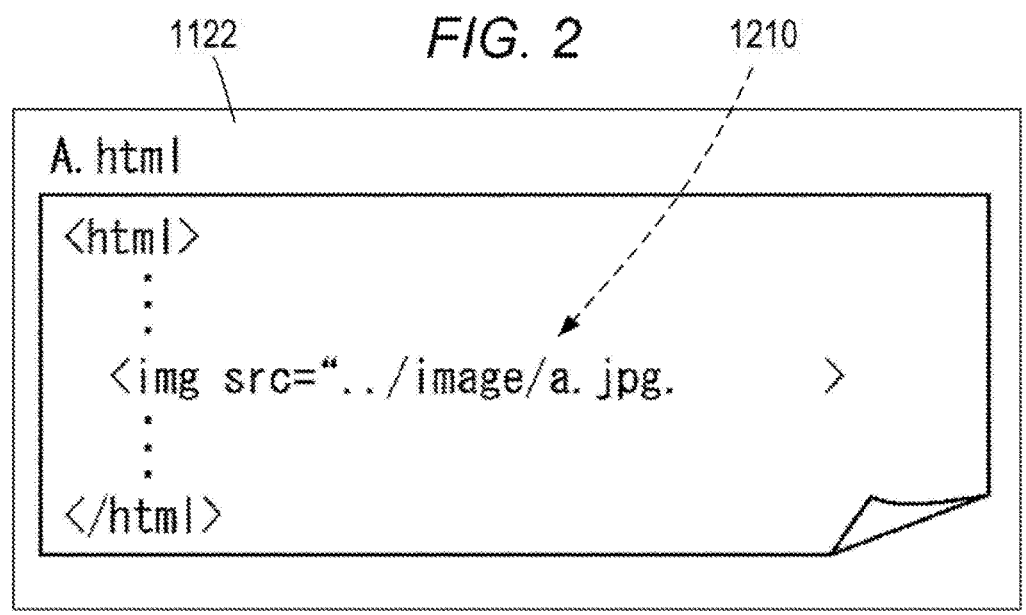
FIG. 2 is a drawing illustrating exemplary description of a relative path in an HTML document.
Figure 3:
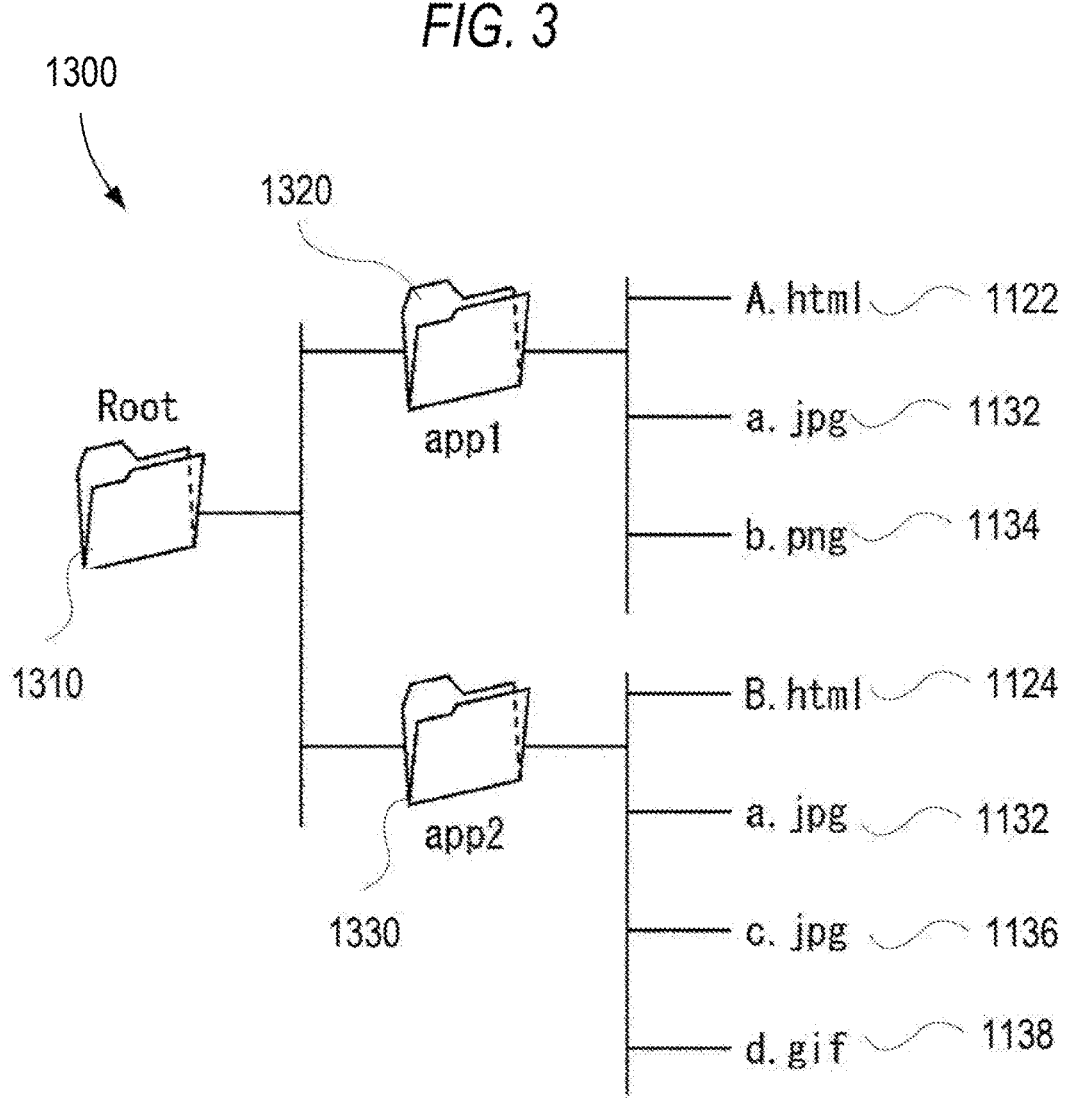
FIG. 3 is a diagram illustrating a directory structure in a data broadcast application production environment.
Figure 4:
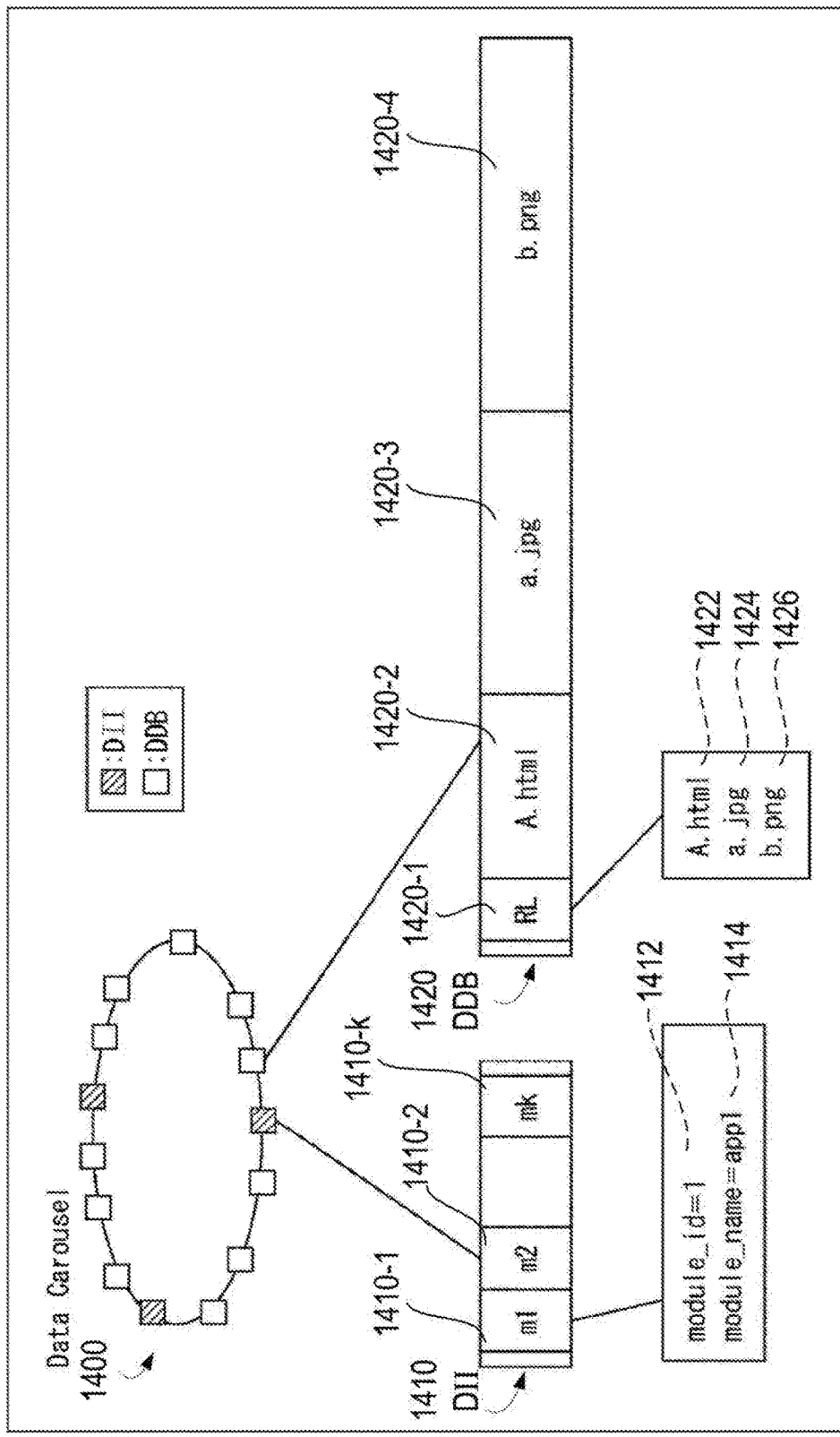
FIG. 4 is a diagram illustrating an outline of data carousel transmission.

Hereinafter, embodiments of the present technology will be described with reference to the drawings.

Concept of Present Technology

FIG. 5 is a drawing for explaining the concept of the present technology.

In FIG. 5, the hierarchical structure shown on the left side of the drawing illustrates a directory structure in a web application production environment (1100), and the hierarchical structure shown on the right side of the drawing illustrates a directory structure in a data broadcast application production environment (1300). It should be noted that in the following description, if it is not necessary to particularly distinct a web application from a data broadcast application, they are simply referred to as applications.

As illustrated in FIG. 5, a web application and a data broadcast application are configured of a plurality of resources such as HTML document files and image files respectively. However, as positions of the resources placed in folders in a hierarchical structure are different, it is impossible to create those applications in the same production environment.

In view of the above, the present technology prepares mapping information in advance, and associates a directory structure for a web application and a directory structure for a data broadcast application, to thereby allow resources, which are referred to according to the directory structure for a web application, to be referred to according to the directory structure for a data broadcast application.

Figure 6:
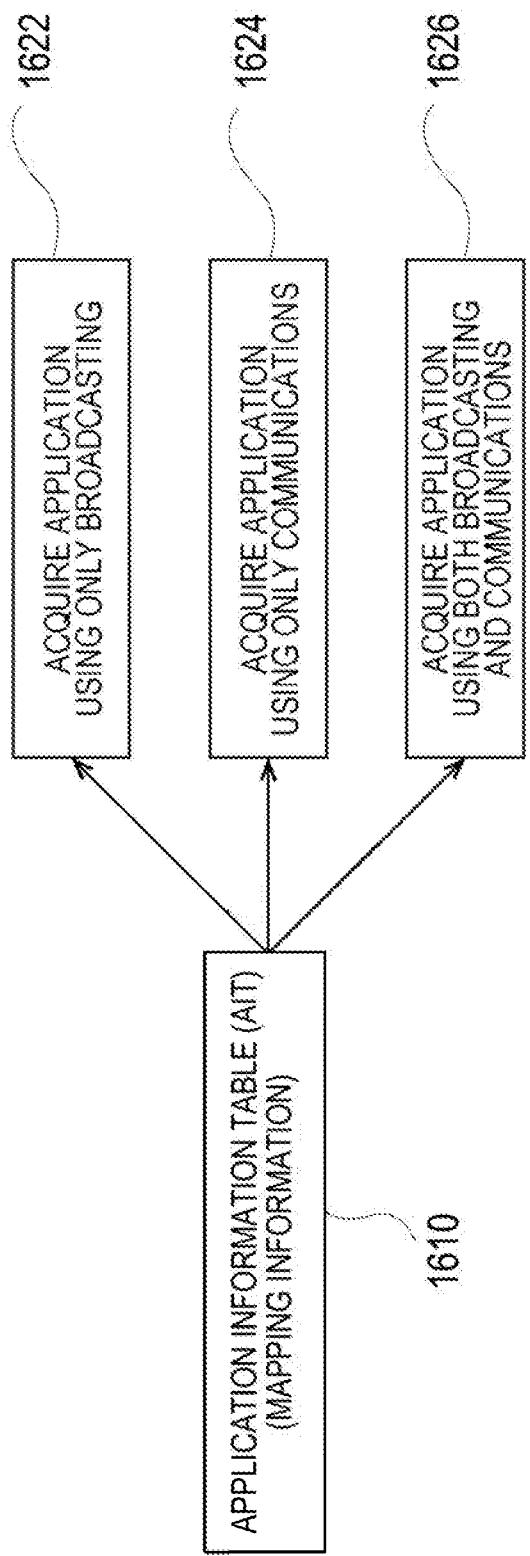
FIG. 6 is a drawing for explaining an outline of AIT.

As illustrated in FIG. 6, mapping information is transmitted by being included in an AIT (Application Information Table, 1610). AIT is control information for controlling operation of an application executed in conjunction with broadcast content. For example, in the AIT, a control command such as "Auto Start" and information such as URL (Uniform Resource Locator) of an application server are described.

Further, as illustrated in FIG. 6, an application controlled based on the AIT is transmitted by means of at least one transmission system of broadcasting and communications (1622, 1624, or 1626).

As described above, in the present technology, as mapping information is transmitted by being included in AIT, even if a data broadcast application is created on the assumption that resources are referred to according to the directory structure for a web application, it is possible to allow the resources to be referred to according to the directory structure for a data broadcast application. Consequently, the producer is able to create the application in an optimum production environment without being conscious of the directory structure for a data broadcast application.

Specific Example of Resource Reference Using Mapping Information

Figure 7:
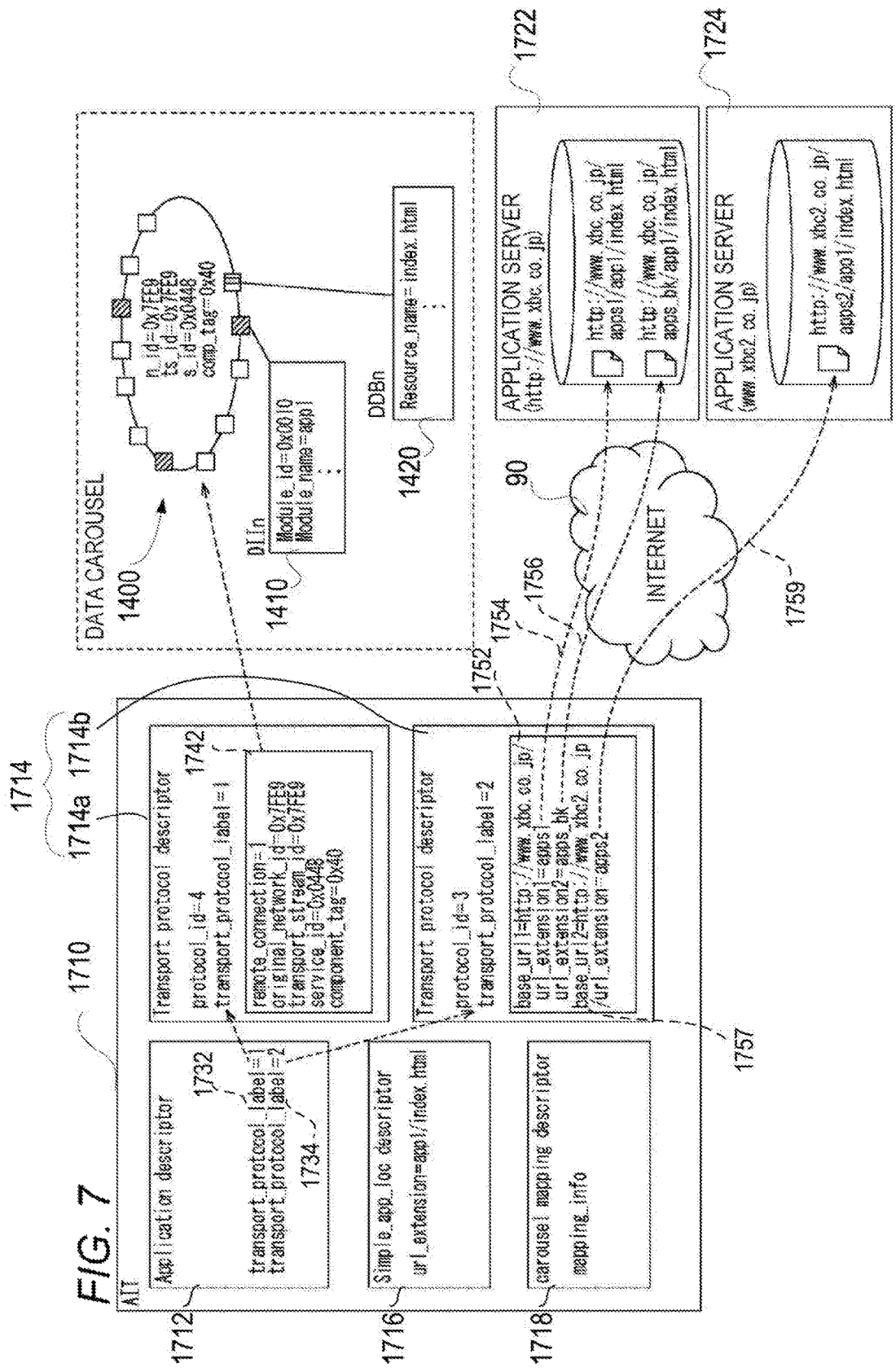
FIG. 7 is a drawing illustrating a specific example of resource reference using mapping information included in AIT.

FIG. 7 is a drawing illustrating a specific example of resource reference using mapping information included in AIT (1710). FIG. 7 illustrates resource reference in the case of using transmission systems of both broadcasting and communications.

As illustrated in FIG. 7, in the AIT 1710 an application descriptor (1712) a transport protocol descriptor (1714), a simple application location descriptor (Simple_app_loc descriptor, 1716) and a carousel mapping descriptor (1718) are placed as descriptors.

In the application descriptor (1712), information regarding the application is described. In the application descriptor (1712), transport_protocol_label may be described.

Transport_protocol_label is a label for designating a transport stream. The transport_protocol_label is specified to "1" (1732) when broadcasting is used as a transport stream, while it is specified to "2" (1734) when communications are used. In the case of the example of FIG. 7, as transmission systems of both broadcasting and communications are used, two types of transport_protocol_label are described, which are specified to "1" and "2", respectively.

In the transport protocol descriptor (1714), information relating to the protocol for transmitting the application is described. However, if a plurality of types of transport_protocol_label are specified by the application descriptor, a plurality of transport protocol descriptors corresponding to them respectively are placed. In the case of the example of FIG. 7, as transport_protocol_label of broadcasting and transport_protocol_label of communications are specified, a transport protocol descriptor (1714a) corresponding to broadcasting and a transport protocol descriptor (1714b) corresponding to communications are placed, respectively.

In the transport protocol descriptor (1714a) corresponding to broadcasting, protocol_id is specified to "4", and transport_protocol_label is specified to "1". Further, in the transport protocol descriptor (1714a), remote_connection, original_network_id, transport_stream_id, service_id, and component_tag (collectively 1742) are specified.

remote_connection is specified to "0" if the AIT and the application are transmitted in the same service, while it is specified to "1" if they are transmitted not in the same service. In the case of the example of FIG. 7, as the AIT and the application are not transmitted in the same service, remote_connection is specified to "1".

original_network_id works as a label which defines a network identification, transport_stream_id is an ID designating a transport stream. As service_id, a unique ID corresponding to a service is specified, component_tag is specified to a value of a component tag of a corresponding stream given by a stream identification descriptor of PMT (Program Map Table).

As such, in the case of the example of FIG. 7, a target data carousel (1400) is specified by original_network_id (n_id)=0x7FE9, transport_stream_id(ts_id)=0x7FE9, service_id(s_id)=0x0448, and component_tag(comp_tag)=0x40.

Thereby, DII (1410) being transmitted by the specified data carousel is obtained, and the configuration of the module is recognized. Then, DDB (1420) is obtained based on the DII, and the target module is reconstructed. In the case of the example of FIG. 7, as Module_id=0x0010 and Module_name=app1 are specified in the DII, the DDB (module) of Module_id=0x010 is obtained. Further, as real data of a plurality of files is included in the DDB, a plurality of Resource_names are listed as Resource List (RL). For example, in the module of Module_id=0x0010, real data of index.html and the like is placed, and by reconstructing the module, resources such as index.html can be referred to.

On the other hand, in the transport protocol descriptor (1714b) corresponding to communications, protocol_id is specified to "3", and transport_protocol_label is specified to "2". Further, in the transport protocol descriptor (1714b) corresponding to communications, base_url and url_extension are specified.

As base_url (1752) a character string in which a scheme name and a host name are linked, for example, is specified. Further, as url_extension (1754 or 1756), a folder name corresponding to the directory structure in a file system of an application server (1722 or 1724), for example, is specified. It should be noted that although url_extension basically corresponds to a folder name, it is not always the case.

Further, even in the simple application location descriptor (1716), url extension may be specified, in which a folder name, a file name, and the like for finally specifying the resource by the producer are specified, for example.

As such, by linking the respective character strings specified by base_url and url extension of the transport protocol descriptor (1714b) corresponding to communications and specified by url_extension of the simple application location descriptor (1716), a URL capable of specifying the resource can be obtained.

In the case of the example of FIG. 7, in the transport protocol descriptor (1714b), Base_url (1752) is specified to "http://www.xbc.co.jp/", url_extension1 (1754) is specified to "apps1", and url_extension2 (1754) is specified to "apps_bk", respectively, while in the simple application location descriptor (1716), url_extension is specified to "app1/index.html". In this case, as two URLs of "http://www.xbc.co.jp/apps1/app1/index.html" and "http://www.xbc.co.jp/apps_bk/app1/index.html" are obtained, it is possible to refer to the resource by accessing the application server (1722) according to the URLs.

Further, in the example of FIG. 7, in the transport protocol descriptor (1714b), Base_url2 (1757) is specified to "http://www.xbc2.co.jp/" and url_extension (1759) is specified to "apps2", respectively, and in the simple application location descriptor (1716), url_extension is specified to "app1/index.html". In this case, as an URL of "http://www.xbc2.co.jp/apps2/app1/index.html" is obtained, it is possible to refer to the resource by accessing the application server (1724) according to the URL.

While the resource constituting an application transmitted by means of broadcasting or communications is referred to as described above, in the case of performing data carousel transmission on a data broadcast application created on the assumption that resources are referred to according to the directory structure for a web application, it is impossible to refer to the resources in this state, as described above. This means that in that case, it is necessary to refer to the resources after converting the path for resource reference corresponding to the directory structure for a web application into a path for resource reference corresponding to the directory structure for a data broadcast application, by using the mapping information.

Figure 8:
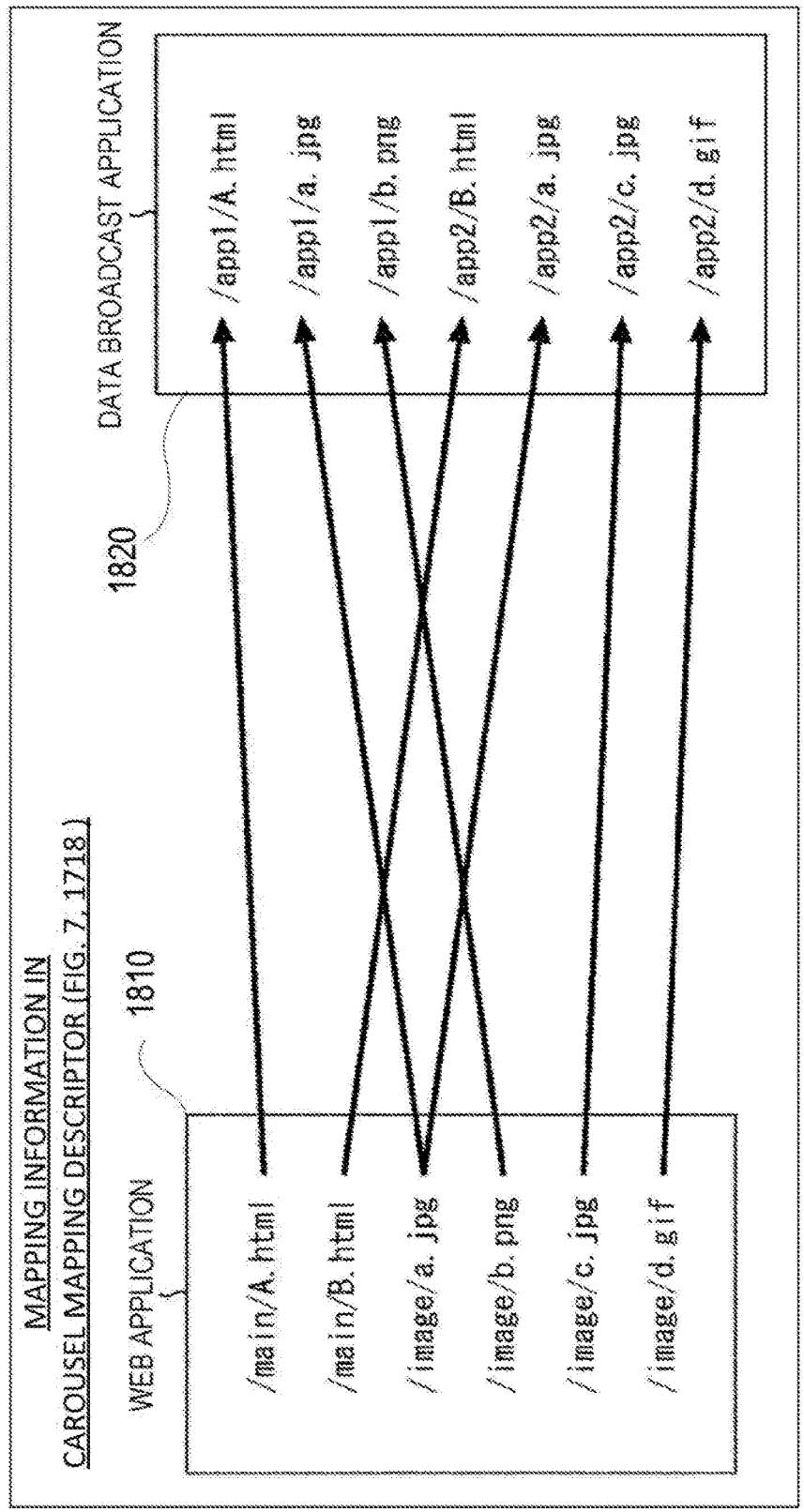
FIG. 8 is a drawing illustrating a specific example of mapping information.

As such, a carousel mapping descriptor (1718) is placed in the AIT (1710). In the carousel mapping descriptor (1718), mapping information (mapping_info) is placed. FIG. 8 illustrates a specific example of mapping information.

As illustrated in FIG. 8, in the web application (1810), various types of resources are placed in folders such as "main" and "image" created by the producer. For example, in the main folder, HTML document files such as A.html and B.html are placed, and in the image folder, image files such as a.jpg, b.png, c.jpg, and d.gif are placed.

On the other hand, in the data broadcast application (1820) resources in module units (acquisition units) such as "app1" and "app2" are placed in blocks. For example, a module which is Module_name=app1 stores A.html, a.jpg, and b.png, and a module which is Module_name=app2 stores B.html, a.jpg, c.jpg, and d.gif.

In FIG. 8, while objects to be mapped are associated by arrows, even the same resources have different directory structures. This means that although A.html is the same resource, while "/main/A.html" is specified in a relative path for resource reference on one hand, "/app1/A.html" is specified on the other hand. Accordingly, the mapping information is configured to associate "/main/A.html" with "/app1/A.html".

Similarly, "/main/B.html" and "/app2/B.html", "/image/b.png" and "/app1/b.png", "/image/c.jpg" and "/app2/c.jpg", "/image/d.gif" and "/app2/d.gif" are associated with each other by the mapping information, respectively. However, as a.jpg is a resource which is referred to from both A.html and B.html and has the same resource name, "/image/a.jpg" is associated with both "/app1/a.jpg" and "/app2/a.jpg".

In this way, as a resource is specified by a relative path which is relative to a particular path in the directory structure for a web application, in the mapping information, a resource specified by the relative path and a resource stored in a module used for data carousel transmission are associated.

As the carousel mapping descriptor, including such mapping information, is placed in the AIT and transmitted, when a resource is referred to from the data broadcast application, the resource is referred to after the path for resource reference is replaced using the mapping information. Consequently, even in the case of a data broadcast application created on the assumption that resources are referred to corresponding to the directory structure for a web application, the resources can be referred to properly.

It should be noted that the mapping information only needs to describe modules requiring replacement. This means that in the case of a data broadcast application created on the assumption that resources are referred to corresponding to the directory structure for a data broadcast application, as there is no need to replace the path for resource reference, mapping information is not needed. If there is no mapping information, resources stored in a module transmitted by data carousel are referred to with use of the path for resource reference described in the data broadcast application as it is.

Further, if there are a plurality of resources having the same name, like a.jpg in FIG. 8, in the mapping information as described above, it is configured that a resource stored in the module being referred to is selected preferentially. For example, when a module of Module_name=app1 is being referred to, it is only necessary that resource reference is performed by replacing the path for resource reference from "/image/a.jpg" to "/app1/a.jpg". Furthermore, if the data size of the mapping information becomes a prescribed value or larger, a plurality of carousel mapping descriptors may be prepared, whereby it is possible to describe the mapping information therein in a divided manner.

The specific example of resource reference using mapping information is as described above.

Descriptor Included in AIT

Next, the details of descriptors placed in the AIT of FIG. 7 will be described with reference to FIGS. 9 to 12.

(Transport Protocol Descriptor)

FIG. 9 is a drawing illustrating the data structure of a transport protocol descriptor (1714a or 1714b).

descriptor_tag describes a tag value assigned to the descriptor. Further, descriptor_length describes the description length of the descriptor.

protocol_id describes ID of a protocol for transmitting an application. When HTTP (HyperText Transfer Protocol) or HTTPS (HTTP over Secure Socket Layer) is used, 0x0003 is described as the value thereof. Further, in the case of using data carousel transmission, 0x0004 is described as the value thereof.

transport_protocol_label corresponds to a parameter of the same name described in the application descriptor.

Selector byte (selector_byte) provides an area in which a data structure is defined for each protocol_id.

If a plurality of transport protocols are specified, a data structure corresponding to each of the transport protocols are defined. FIG. 10 illustrates a data structure of a selector byte when 0x0004 is specified as protocol_id, that is, in the case of data carousel transmission. Further, FIG. 11 illustrates a data structure of a selector byte when 0x0003 is specified as protocol_id, that is, in the case of communication transmission using HTTP or the like.

(Selector Byte in Data Carousel Transmission)

FIG. 10 is a drawing illustrating a data structure of a selector byte (2010) in the case of data carousel transmission (e.g., "selector_byte" in FIG. 9 for transport protocol descriptor 1714a).

In remote_connection, "0" is specified when AIT and an application are transmitted in the same service, while "1" is specified when they are not transmitted in the same service. However, in the case where AIT is obtained by communications, remote_connection is specified to "1".

When remote_connection is specified to "1", original_network_id, transport_stream_id, and service_id are described. Further, component_tag is described regardless of the value of remote_connection.

(Selector Byte in Communication Transmission)

FIG. 11 is a diagram illustrating a data structure of a selector byte (2110) in the case of communications by HTTP or HTTPS (e.g., . . . "selector_byte" in FIG. 9 for transport protocol descriptor 1714b).

In URL_base_length, the description length of base_url is described. URL_base_byte provides an area in which base_url is described.

In URL_extension_count, as there is a case where a plurality of url_extensions are specified, a loop frequency corresponding to the number is described. Further, in URL_extension_length, the description length of url_extension is described. URL_extension_byte provides an area in which url_extension is described.

Description of the transport protocol descriptor is as given above.

(Carousel Mapping Descriptor)

FIG. 12 is a drawing illustrating a data structure of a carousel mapping descriptor 2210 (e . . . an example for carousel mapping descriptor 1718).

In descriptor_tag, a tag value assigned to the descriptor is described. Further, in descriptor_length, the descriptor length of the descriptor is described.

In number_of_modules, a loop frequency corresponding to the number of modules in which mapping information is specified is described. In module_id, ID of a module is specified.

In number_of_resources, a loop frequency corresponding to the number of resources is described. Further, in URI_length, the description length of URI_data is described. URI_data_byte provides an area in which URI_data is described.

This means that by placing "/main/A.html", "/image/a.jpg", and "/image/b.png" as URI_data in the loop of module_id=1, and further, placing "/main/B.html", "/image/a.jpg", "/image/c.jpg", and "/image/d.gif" as URI_data in the loop of module_id=2, the mapping information illustrated in FIG. 8 is obtained. However, it is assumed that module_name of module_id=1 is "app1", and that module_name of module_id=2 is "app2".

Description of the carousel mapping descriptor is as given above.

First Embodiment

Exemplary Configuration of Broadcast/Communication Cooperation System

Next, a specific configuration for realizing resource reference using mapping information of the present technology will be described.

FIG. 13 is a drawing illustrating a configuration of an embodiment of a broadcast/communication cooperation system to which the present technology is applied.

As illustrated in FIG. 13, a broadcast/communication cooperation system 1 is configured of a transmission device 10, a receiving device 20, and an application server 30. The receiving device 20 and the application server 30 are connected with each other over the Internet 90.

The transmission device 10 transmits broadcast content such as broadcast programs using digital television broadcast signals. The transmission device 10 also transmits a data broadcast application by means of data carousel transmission. A data broadcast application is configured of HTML document files, image files, and the like, for example.

The receiving device 20 is a receiver such as a television receiver. The receiving device 20 receives broadcast signals transmitted from the transmission device 10 and obtains video and audio of the broadcast content. The receiving device 20 displays obtained video on a display, and outputs audio corresponding to the video from a speaker.

Further, the receiving device 20 obtains a data broadcast application from broadcast signals transmitted from the transmission device 10, and displays it.

The application server 30 manages web applications. Here, a web application is configured of HTML document files, image files, and the like. The application server 30 provides the receiving device 20 with a web application over the Internet 90 in response to a request from the receiving device 20.

The receiving device 20 requests the application server 30 for a web application over the Internet 90. The receiving device 20 receives the web application provided from the application server 30 in response to the request, and displays it.

It should be noted that in the exemplary configuration of FIG. 13, while only one receiving device 20 is illustrated in order to simplify the description, the broadcast/communication cooperation system 1 is configured of a plurality of receiving devices 20 in practice, and each of the receiving devices 20 receives broadcast content from the transmission device 10. Similarly, while only one application server 30 is illustrated in FIG. 1, a plurality of application servers are provided on a broadcaster basis, for example, in practice.

The description of the broadcast/communication cooperation system 1 is as given above.

Exemplary Configuration of Transmission Device

FIG. 14 is a drawing illustrating a configuration of an embodiment of a transmission device to which the present technology is applied.

As illustrated in FIG. 14, the transmission device 10 includes an audio acquisition unit 111, an audio encoder 112, a video acquisition unit 113, a video encoder 114, a data-broadcast data acquisition unit 115, a data-carousel data generation unit 116, an AIT data acquisition unit 117, an AIT generation unit 118, a multiplexing unit 119, and a transmission unit 120.

The audio acquisition unit 111 acquires an audio signal of broadcast content from an external server, a microphone, a recording medium, or the like, and supplies it to the audio encoder 112.

The audio encoder 112 encodes audio signals, supplied from the audio acquisition unit 111, in conformity with a coding system such as MPEG (Moving Picture Experts Group) 2, and supplies an audio stream, obtained as a result thereof, to the multiplexing unit 119.

The video acquisition unit 113 acquires a video signal of broadcast content from an outside server, camera, a recording medium, or the like, and supplies it to the video encoder 114.

The video encoder 114 encodes the video signals, supplied from the video acquisition unit 113, in conformity with a coding system such as MPEG2, and supplies a video stream, obtained as a result thereof, to the multiplexing unit 119.

The data-broadcast data acquisition unit 115 acquires data for data broadcasting to be transmitted by means of data carousel transmission, and supplies it to the data-carousel data generation unit 116. For example, as data for data broadcasting, HTML document files, image files such as JPEG (Joint Photographic Experts Group) and PNG (Portable Network Graphics), and the like are prepared.

The data-carousel data generation unit 116 generates data for data carousel based on the data supplied from the data-broadcast data acquisition unit 115, and supplies it as section data to the multiplexing unit 119. However, data-carousel data is to be transmitted by means of data carousel transmission by each object constituting data called a module.

The AIT data acquisition unit 117 acquires data for AIT, and supplies it to the AIT generation unit 118. For example, as data for AIT, data such as an application descriptor, a transport protocol descriptor, a simple application location descriptor, and a carousel mapping descriptor is prepared.

The AIT generation unit 118 generates an AIT based on the data supplied from the AIT data acquisition unit 117, and supplies it as section data to the multiplexing unit 119.

The multiplexing unit 119 multiplexes an audio stream from the audio encoder 112, a video stream from the video encoder 114, and section data from the data-carousel data generation unit 116, and the AIT generation unit 118, and supplies a transport stream, obtained as a result thereof, to the transmission unit 120.

It should be noted that to the multiplexing unit 119, subtitle data is supplied as needed and multiplexed with the transport stream, although not illustrated for the sake of simplifying the description.

The transmission unit 120 transmits the transport stream, supplied from the multiplexing unit 119, as broadcast signals via an antenna 121.

The transmission device 10 is configured as described above.

Exemplary Configuration of Receiving Device

Figure 15:
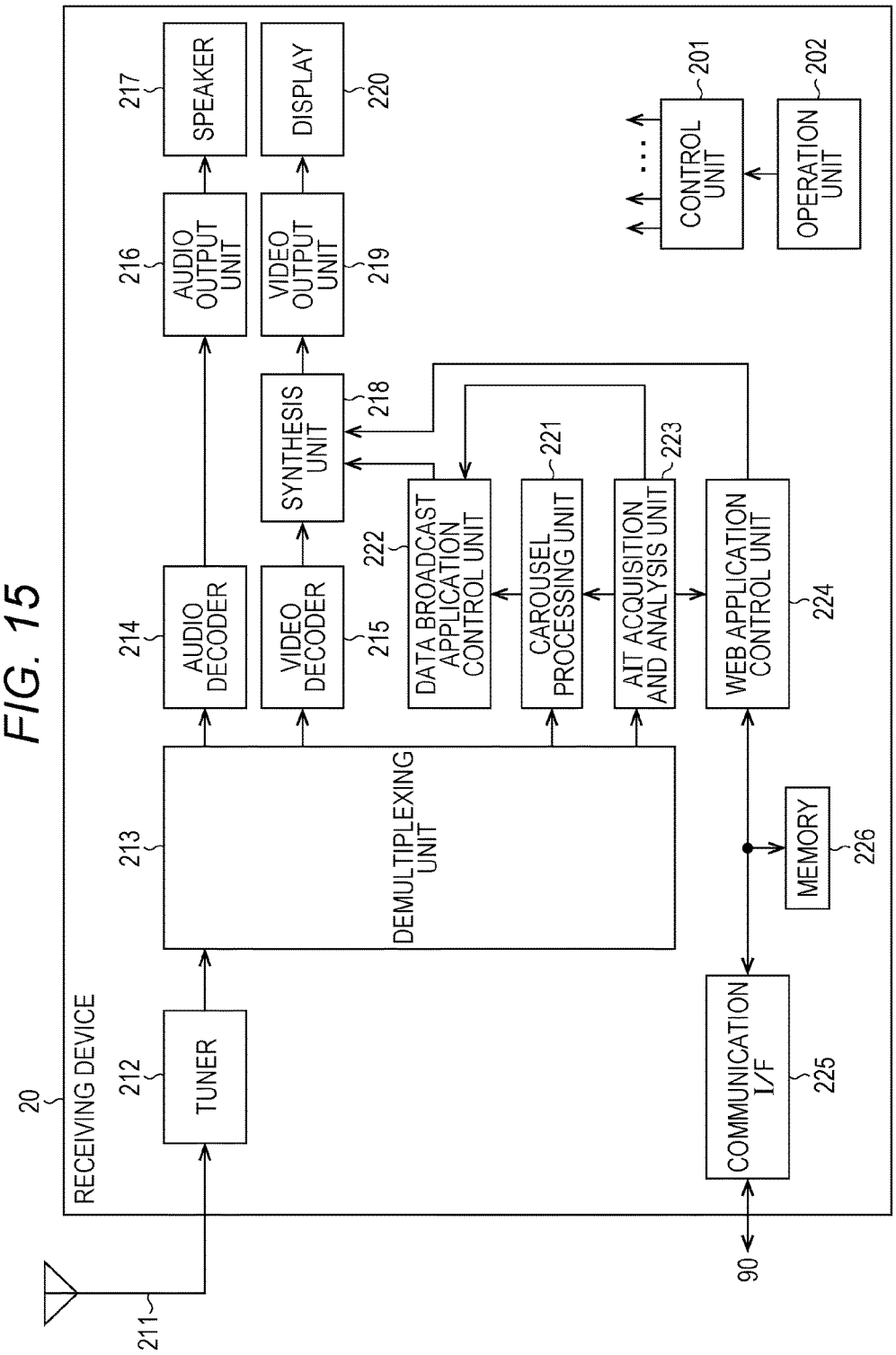
FIG. 15 is a drawing illustrating a configuration of an embodiment of a receiving device to which the present technology is applied.

FIG. 15 is a drawing illustrating a configuration of an embodiment of a receiving device to which the present technology is applied.

The receiving device 20 is configured of a control unit 201, an operation unit 202, a tuner 212, a demultiplexing unit 213, an audio decoder 214, a video decoder 215, an audio output unit 216, a speaker 217, a synthesis unit 218, a video output unit 219, a display 220, a carousel processing unit 221, a data broadcast application control unit 222, an AIT acquisition and analysis unit 223, a web application control unit 224, a communication I/F 225, and a memory 226.

The control unit 201 controls operation of respective units of the receiving device 20.

The operation unit 202 supplies operation signals corresponding to the operation of a user to the control unit 201. For example, when a user operates a remote controller (not illustrated), an operation signal corresponding to the operation is supplied to the control unit 201. The control unit 201 controls operation of the respective units of the receiving device 20 according to operation signals from the operation unit 202.

The tuner 212 extracts, from broadcast signals received by an antenna 211, a broadcast signal of a channel which is selected by an instruction, and demodulates it, and supplies a transport stream obtained as a result thereof to the demultiplexing unit 213.

The demultiplexing unit 213 separates the transport stream, supplied from the tuner 212, into an audio stream, a video stream, and section data. Among the separated streams, the demultiplexing unit 213 transmits the audio stream to the audio decoder 214, transmits the video stream to the video decoder 215, and transmits the section data to the carousel processing unit 221 and the AIT acquisition and analysis unit 223, respectively.

The audio decoder 214 decodes the audio stream supplied from the demultiplexing unit 213, by means of a decoding system corresponding to the coding system of the audio encoder 112 (FIG. 14), and supplies an audio signal obtained as a result thereof to the audio output unit 216.

The audio output unit 216 supplies the audio signal, supplied from the audio decoder 214, to the speaker 217. Thereby, from the speaker 217, audio corresponding to the video of a broadcast program or the like is output.

The video decoder 215 decodes the video stream, supplied from the demultiplexing unit 213, by means of a decoding method corresponding to the coding method of the video encoder 114 (FIG. 14), and supplies the video signal obtained as a result thereof to the synthesis unit 218. The synthesis unit 218 supplies the video signal, supplied from the video decoder 215, to the video output unit 219.

The video output unit 219 supplies the video signal, supplied from the synthesis unit 218, to the display 220. Thereby, the video of a broadcast program or the like is displayed on the display 220.

The carousel processing unit 221 performs section filtering on DSM-CC (Digital Storage Media—Command and Control) section transmitted by means of data carousel transmission, of the section data separated by the demultiplexing unit 213. Then, the carousel processing unit 221 performs analysis processing of DII (Download Info Indication) and DDB (Download Data Block) obtained as a result thereof. The carousel processing unit 221 supplies data of resources of HTML document files, image files, and the like included in the DDB, obtained as a result of analysis processing of the DII and the DDB, to the data broadcast application control unit 222 in units of modules.

It should be noted that data of the data broadcast application is transmitted by means of data carousel transmission by each object constituting data called a module.

The data broadcast application control unit 222 controls operation of a data broadcast application obtained from the data of resources supplied from the carousel processing unit 221. For example, if the data broadcast application is configured of HTML document files and the like, the data broadcast application control unit 222 controls the HTML browser to execute the data broadcast application. The video signal corresponding to the data broadcast application is supplied to the synthesis unit 218.

It should be noted that if the data broadcast application is configured of BML document files and the like, a BML browser is used.

To the synthesis unit 218, a video signal from the video decoder 215 and a video signal from the data broadcast application control unit 222 are supplied. The synthesis unit 218 synthesizes a video signal of a broadcast program or the like and a video signal of a data broadcast application, and supplies it to the video output unit 219. Thereby, on the display 220, video in which information of data broadcast such as whether forecast is superimposed is displayed with respect to the broadcast program, for example.

Further, a broadcast signal includes an AIT section, besides the DSM-CC section described above. The AIT acquisition and analysis unit 223 regularly monitors the section data of the AIT separated by the demultiplexing unit 213, and obtains the AIT. The AIT acquisition and analysis unit 223 analyzes the obtained AIT, and supplies the analysis result to the carousel processing unit 221, and the data broadcast application control unit 222 or the web application control unit 224.

In accordance with the AIT analysis result from the AIT acquisition and analysis unit 223, the carousel processing unit 221 supplies data of resources such as HTML document files and image files in module units, to the data broadcast application control unit 222. As such, in the case of a data broadcast application created on the assumption that resources are referred to corresponding to the directory structure for a web application, as mapping information is obtained, the carousel processing unit 221 uses the mapping information to replace the path for resource reference and refers to the resources. Thereby, the carousel processing unit 221 is able to obtain resource data in module units.

The data broadcast application control unit 222 controls operation of a data broadcast application in accordance with an AIT analysis result from the AIT acquisition and analysis unit 223. Further, the web application control unit 224 controls operation of a web application in accordance with an AIT analysis result from the AIT acquisition and analysis unit 223.

The communication I/F 225 accesses the application server 30 over the Internet 90 according to control by the web application control unit 224, and requests for a web application. The communication I/F 225 receives the web application supplied from the application server 30, and stores it in the memory 226.

The web application control unit 224 reads a web application stored in the memory 226 in accordance with an AIT analysis result from the AIT acquisition and analysis unit 223, and controls operation of the web application. For example, if the web application is configured of HTML document files and the like, the web application control unit 224 executes the web application by controlling the HTML browser. A video signal corresponding to the web application is supplied to the synthesis unit 218.

To the synthesis unit 218, a video signal from the video decoder 215 and a video signal from the web application control unit 224 are supplied. The synthesis unit 218 synthesizes a video signal of a broadcast program or the like and a video signal of a web application, and supplies it to the video output unit 219. Thereby, with respect to the broadcast program, video, on which a web page or the like relating to the program is superimposed, is displayed on the display 220, for example.

It should be noted that in FIG. 15, while it has been described that the data broadcast application control unit 222 and the web application control unit 224 are different blocks for the convenience of description, it is possible to provide an application control unit in which those blocks are integrated. That is, in that case, the application control unit controls operation of both the data broadcast application and the web application.

The receiving device 20 is configured as described above.

Exemplary Configuration of Application Server

Figure 16:
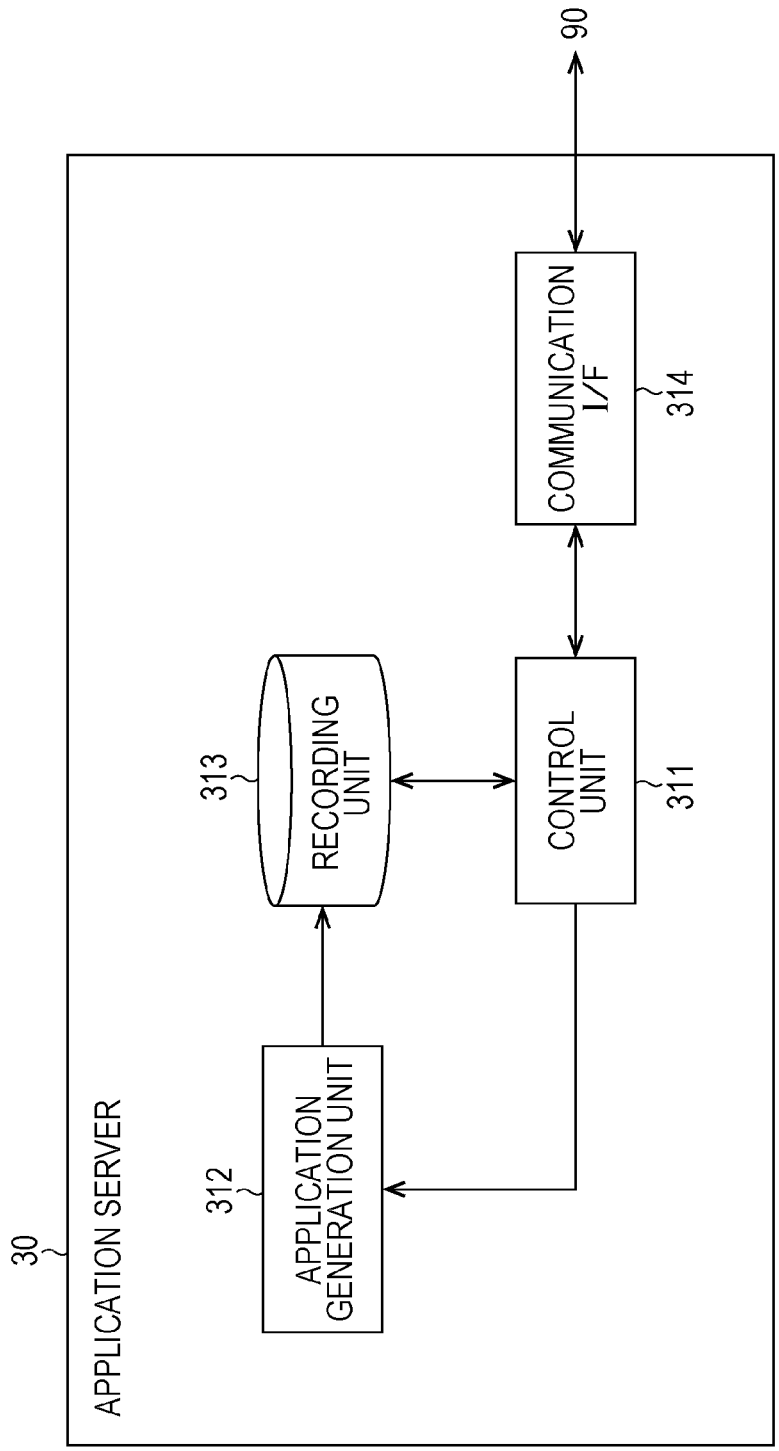
FIG. 16 is a drawing illustrating an exemplary configuration of an application server.

FIG. 16 illustrates an exemplary configuration of the application server 30 of FIG. 13.

The application server 30 is configured of a control unit 311, an application generation unit 312, a recording unit 313, and a communication I/F 314.

The control unit 311 controls operation of the respective units of the application server 30.

The application generation unit 312 generates a web application according to control by the control unit 311, and records it in the recording unit 313. Here, a web application is configured of HTML document files, image files such as JPEG and PNG, and the like. These resources are placed according to the directory structure of the file system of the application server 30.

When a web application is requested from the receiving device 20, the control unit 311 reads the web application from the recording unit 313 and obtains it.

The communication I/F 314 transmits a web application to the receiving device 20 over the Internet 90 according to the control by the control unit 311.

The application server 30 is configured as described above.

Specific Contents of Processing Performed by Respective Devices

Figure 17:
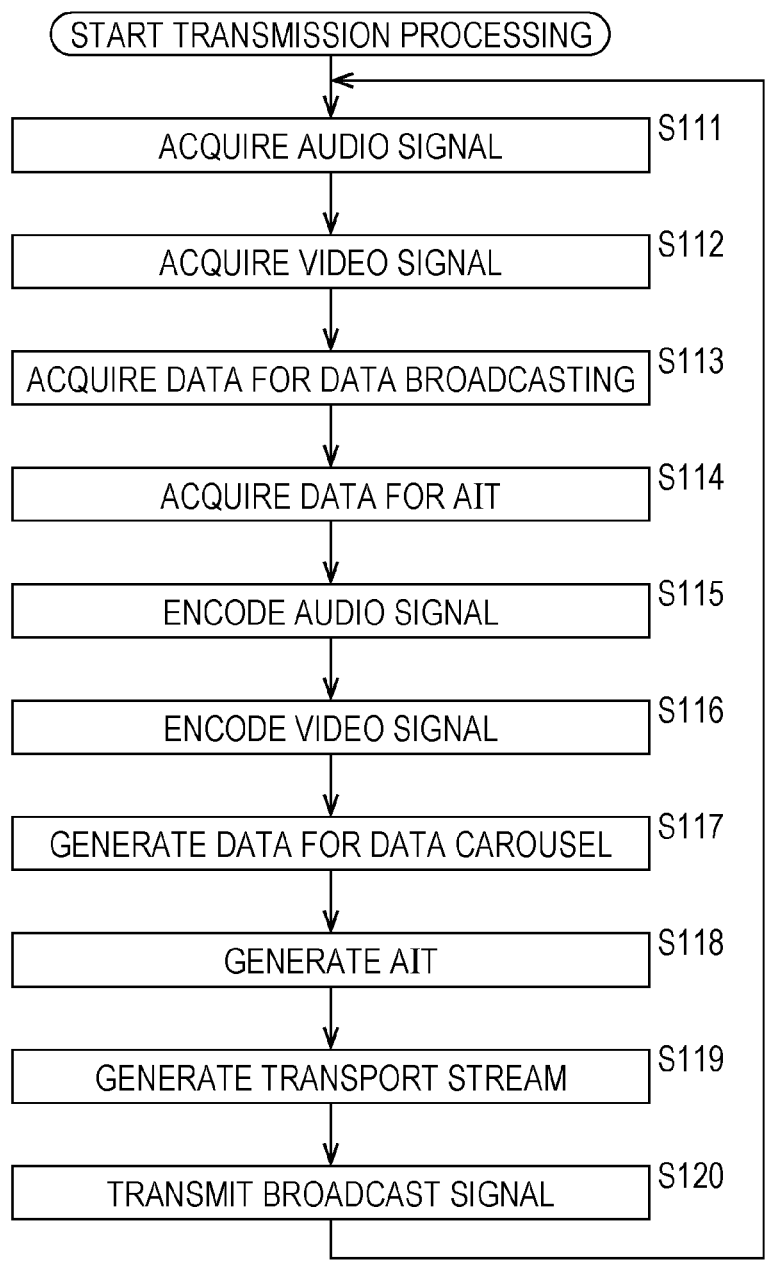
FIG. 17 is a flowchart explaining transmission processing.
Figure 18:
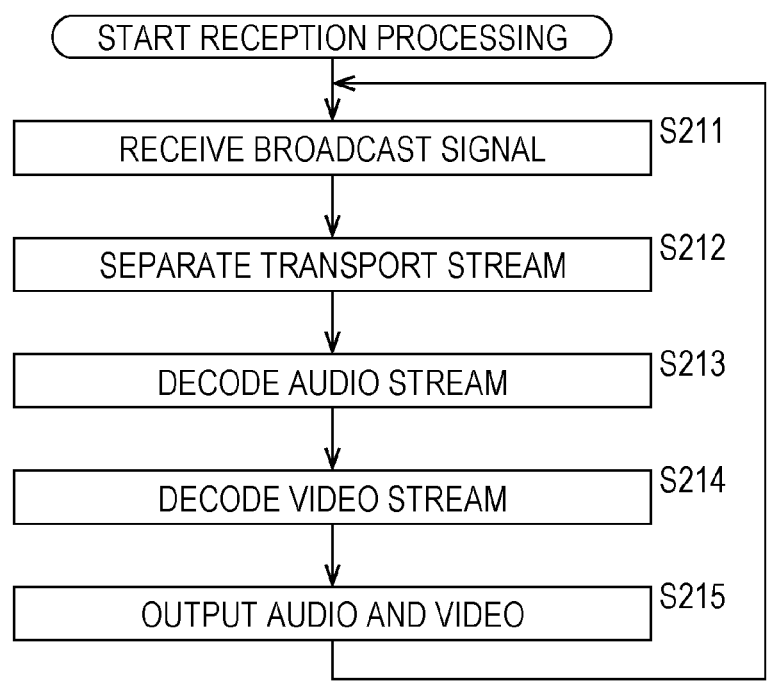
FIG. 18 is a flowchart explaining reception processing.

Next, with reference to FIGS. 17 to 19, specific contents of processing performed by the respective devices constituting the broadcast/communication cooperation system 1 will be described.

(Transmission Processing)

First, transmission processing performed by the transmission device 10 will be described with reference to the flowchart of FIG. 17.

At step S111, the audio acquisition unit 111 acquires an audio signal corresponding to the audio of the broadcast content from an outside server or the like. Further, at step S112, the video acquisition unit 113 acquires a video signal corresponding to the video of the broadcast content from an outside server or the like.

At step S113, the data-broadcast data acquisition unit 115 acquires data for data broadcasting. Further, at step S114, the AIT data acquisition unit 117 acquires data for AIT.

At step S115, the audio encoder 112 encodes the audio signal acquired by the audio acquisition unit 111 and generates an audio stream.

At step S116, the video encoder 114 encodes the video signal acquired by the video acquisition unit 113 and generates a video stream.

At step S117, the data-carousel data generation unit 116 generates data for data carousel based on the data for data broadcasting acquired by the data-broadcast data acquisition unit 115. The data for data carousel is configured of section data in a section form.

At step S118, the AIT generation unit 118 generates an AIT based on the data for AIT acquired by the AIT data acquisition unit 117. The data for AIT is configured of section data in a section form.

At step S119, the multiplexing unit 119 multiplexes the audio stream generated by the audio encoder 112, the video stream generated by the video encoder 114, and the section data generated by the data-carousel data generation unit 116 and the AIT generation unit 118, to thereby generate a transport stream.

At step S120, the transmission unit 120 transmits the transport stream, generated by the multiplexing unit 119, as a broadcast signal via the antenna 121. Upon completion of the processing of step S120, the processing is returned to step S111, and the subsequent processing is repeated.

The description of the transmission processing ends.

(Reception Processing)

Next, reception processing performed by the receiving device 20 will be described with reference to the flowchart of FIG. 18.

At step S211, the tuner 212 extracts a broadcast signal of a channel instructed to be selected, from broadcast signals received by the antenna 211, and demodulates it.

At step S212, the demultiplexing unit 213 separates the transport stream, demodulated by the tuner 212, into an audio stream, a video stream, and section data.

At step S213, the audio decoder 214 decodes the audio stream separated by the demultiplexing unit 213 to thereby generate an audio signal.

At step S214, the video decoder 215 decodes the video stream separated by the demultiplexing unit 213 to thereby generate a video signal.

At step S215, the speaker 217 outputs the audio corresponding to the audio signal. Further, the display 220 displays the video corresponding to the video signal. Thereby, video of broadcast content such as a broadcast program is displayed on the display 220, and the audio corresponding to the video is output from the speaker 217.

Upon completion of the processing of step S215, the processing is returned to step S211 and the subsequent processing is repeated.

The description of the reception processing ends.

(Application Display Processing)

Next, application display processing performed by the receiving device 20 will be described with reference to the flowchart of FIG. 19.

At step S251, the control unit 201 determines whether or not selection of a channel is instructed, based on an operation signal from the operation unit 202.

At step S251, after waiting for an instruction to select a channel, the processing is proceeded to step S252.

At step S252, the AIT acquisition and analysis unit 223 regularly monitors section data of the AIT, separated by the demultiplexing unit 213, to thereby acquire the AIT. Further, at step S253, the AIT acquisition and analysis unit 223 analyzes the acquired AIT.

At step S254, it is determined whether or not to display an application. At step S254, after waiting for a determination to display the application, the processing is proceeded to step S255.

At step S255, the AIT acquisition and analysis unit 223 determines whether or not to acquire a resource from the data carousel, based on the analysis result of the acquired AIT. Here, a source from which a resource is acquired is determined by a parameter of the transport protocol descriptor placed in the AIT.

This means that if 0x0004 is specified as protocol_id and a parameter about data carousel transmission is described in the selector byte, it is determined that a resource is acquired from the data carousel. On the other hand, if 0x0003 is specified as protocol_id and a parameter about communication transmission using HTTP or the like is described, it is determined that a resource is acquired from the application server 30. However, as illustrated in FIG. 7, if both parameters of data carousel transmission and communication transmission using HTTP or the like are described, data carousel transmission is preferred, for example, according to the operation thereof.

At step S255, if it is determined that a resource is acquired from the data carousel, the processing is proceeded to step S256. At step S256, the AIT acquisition and analysis unit 223 determines whether or not the path for resource reference is associated by the mapping information, based on the analysis result of the acquired AIT.

At step S256, if it is determined that the path for resource reference is associated by the mapping information, the processing is proceeded to step S257. At step S257, the carousel processing unit 221 replaces the path for resource reference using the mapping information from the AIT acquisition and analysis unit 223. Then, at step S258, the carousel processing unit 221 refers to the module on which data carousel transmission is to be performed and the resource stored in the module in accordance with the replaced path for resource reference, and acquires the data of the resource.

Thereby, even in the case of a data broadcast application created on the assumption that a resource is referred to corresponding to the directory structure for a web application, it is possible to refer to the resource properly.

On the other hand, at step S256, if it is determined that the path for resource reference is not associated by the mapping information, as there is no need to replace the path for resource reference, step S257 is skipped and the processing is proceeded to step S258. In that case, the carousel processing unit 221 uses the path for resource reference as it is and refers to the module on which data carousel transmission is performed and the resource stored in the module to thereby acquire data of the resource (S258). This means that in the case of a data broadcast application created on the assumption that a resource is referred to corresponding to the directory structure of a data broadcast application, replacement of the path for resource reference is not performed.

When the resource is acquired at step S258, the processing is proceeded to step S259. At step S259, the data broadcast application control unit 222 allows the data broadcast application, obtained from the data of the resource from the carousel processing unit 221, to be displayed on the display 220 via the synthesis unit 218 and the video output unit 219.

Meanwhile, at step S255, if it is determined that a resource is acquired from the application server 30, the processing is proceeded to step S260. At step S260, the web application control unit 224 controls the communication I/F 225 based on the analysis result of the AIT from the AIT acquisition and analysis unit 223 to thereby acquire a resource of the web application from the application server 30. Then, the web application control unit 224 allows the web application to be displayed on the display 220 via the synthesis unit 218 and the video output unit 219 (S259).

When the application is displayed at step S259, the processing is proceeded to step S261. At step S261, it is determined whether or not to perform transition of the displayed application. At step S261, if it is determined to perform transition of the displayed application, the processing is returned to step S255, and the subsequent processing is repeated.

On the other hand, at step S261, if it is determined not to perform transition of the application, the processing is proceeded to step S262. At step S262, it is determined whether or not to end the application. At step S262, if it is determined to continue execution of the application, the processing is returned to step S261 and the determination processing at step S261 is repeated.

Figure 19:
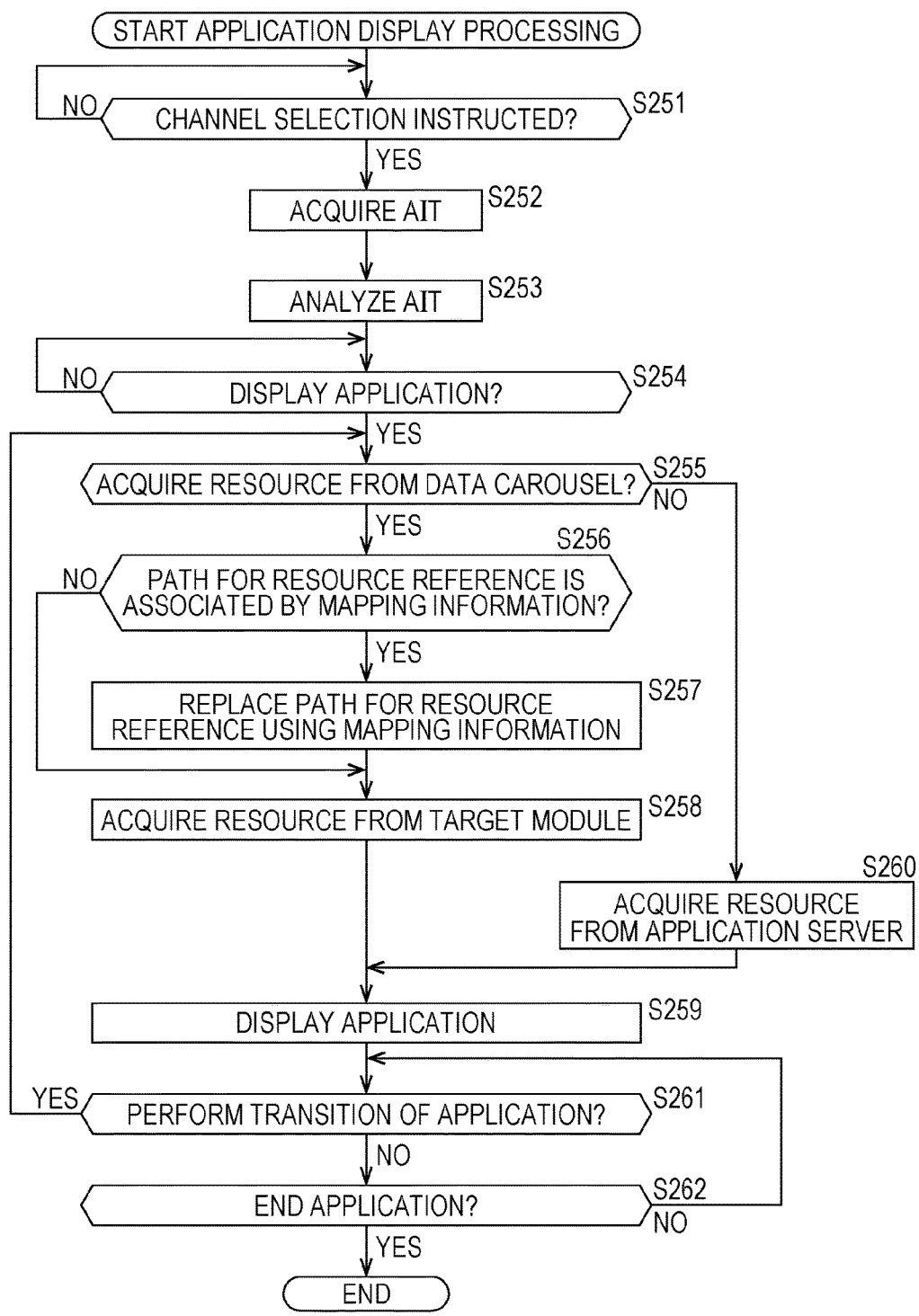
FIG. 19 is a flowchart explaining application display processing.

Then, at step S262, if it is determined to end the application, the application display processing of FIG. 19 ends.

The description of the application display processing ends.

Second Embodiment

Exemplary Configuration of
Broadcast/Communication Cooperation System

Figure 20:
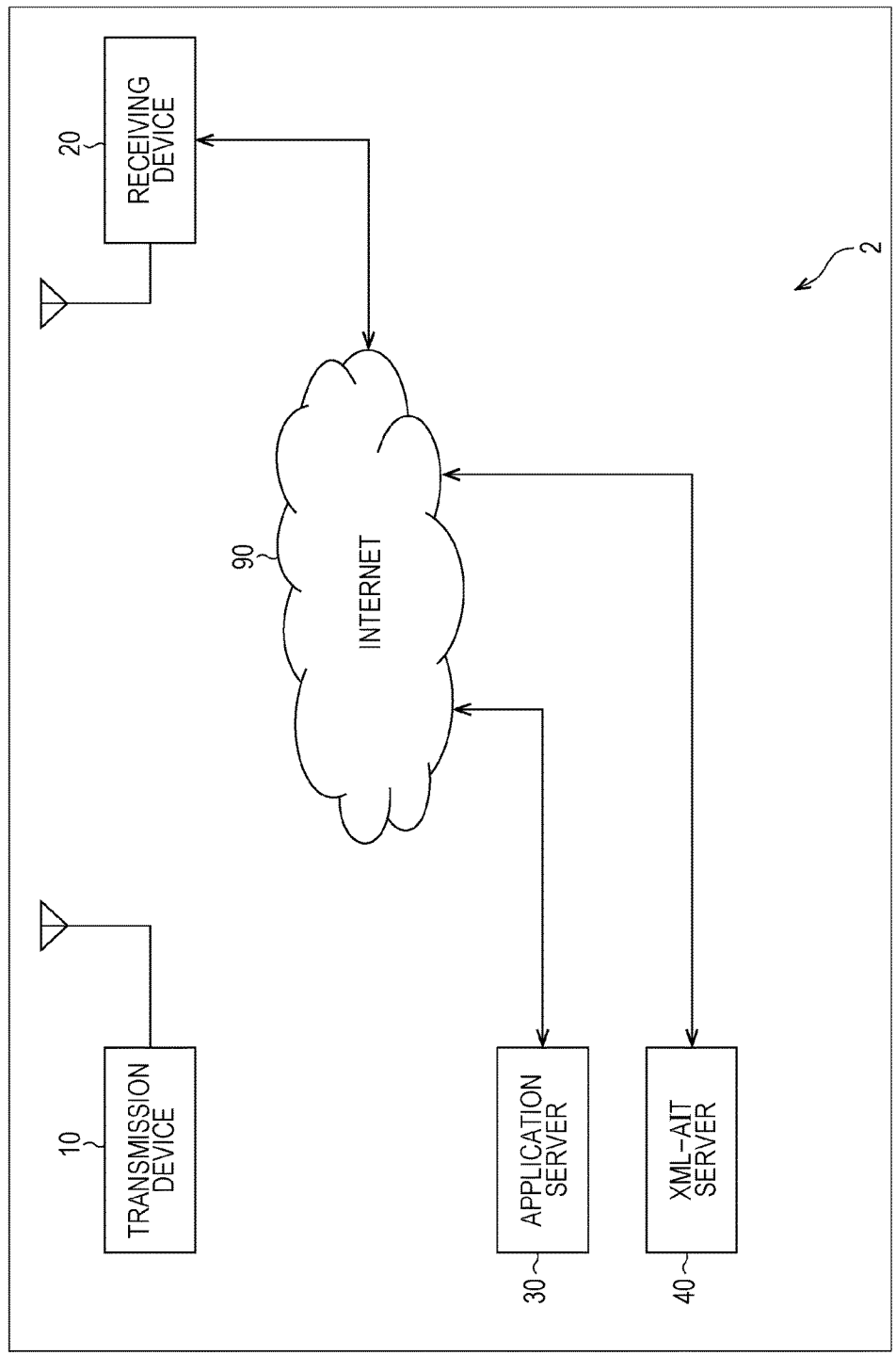
FIG. 20 is a drawing illustrating another configuration of an embodiment of a transmission/communication cooperation system to which the present technology is applied.

FIG. 20 is a drawing illustrating another configuration of an embodiment of a broadcast/communication cooperation system to which the present technology is applied. As illustrated in FIG. 20, a broadcast/communication cooperation system 2 is configured of the transmission device 10, the receiving device 20, the application server 30, and an XML-AIT server 40.

The XML-AIT server 40 manages an XML-AIT. The XML-AIT server 40 supplies an XML-AIT to the receiving device 20 over the Internet 90 in response to a request from the receiving device 20.

Here, the XML-AIT is an AIT (Application Information Table) described in XML (Extensible Markup Language) format. For example, in the XML-AIT, a control command such as "Auto Start" and control information for controlling operation of an application such as URL (Uniform Resource Locator) of the application server 30 are described.

The receiving device 20 obtains the XML-AIT by accessing the XML-AIT server 40 over the Internet 90. The receiving device 20 obtains a web application, set to be automatically executed immediately, from the application server 30 based on the XML-AIT for example, and executes it immediately.

In this way, in the case of the configuration of FIG. 20, the AIT is not transmitted by broadcasting but is transmitted by communications using the Internet 90. Further, the AIT is configured of data in binary format or XML format, and the AIT in binary format is transmitted by means of AIT section or data carousel transmission. On the other hand, the XML-AIT in XML format may be transmitted by means of not only communications but also data carousel transmission.

The description of the broadcast/communication cooperation system 2 is as described above.

It should be noted that in the case where streaming reproduction of communication content is instructed, the receiving device 20 is able to access a delivery server (not illustrated) provided on the Internet 90 and perform streaming reproduction of communication content delivered from the delivery server. Here, communication content is a broadcast program which was broadcasted, a movie which was released, or an original video program, which are delivered by VOD (Video On Demand) for example. Further, the application described above may be executed in conjunction with communication content.

As described above, according to the present technology, it is possible to create an application under an optimum production environment for a producer of the application.

In particular, as a producer of a web application is used to a production environment of a web application, even in the case of creating a data broadcast application configured of HTML document files, image files, and the like, there is a demand to create the application in a production environment of a web application. Such an environment can be realized by only placing mapping information in the AIT. As a result, the operation efficiency of the producer of the application is improved, whereby it is possible to improve the efficiency of application development and to reduce the development cost.

It should be noted that while in the above description the receiving device 20 is described as a television receiver, the receiving device 20 is not limited thereto. For example, with a configuration not including a display or a speaker, the function may be incorporated in an electronic device such as a video recorder. Further, the present technology is applicable not only to a television receiver but also electronic devices such as a personal computer, a tablet terminal device, and a mobile telephone.

Description of Computer to Which the Present
Technology is Applied

A series of processing described above may be performed by hardware or software. In the case of performing a series of processing by software, a program constituting the software is installed in a computer. Here, the computer includes a computer incorporated in a dedicated hardware, a generalpurpose personal computer capable of performing various types of functions with various types of programs installed therein, or the like.

Figure 21:
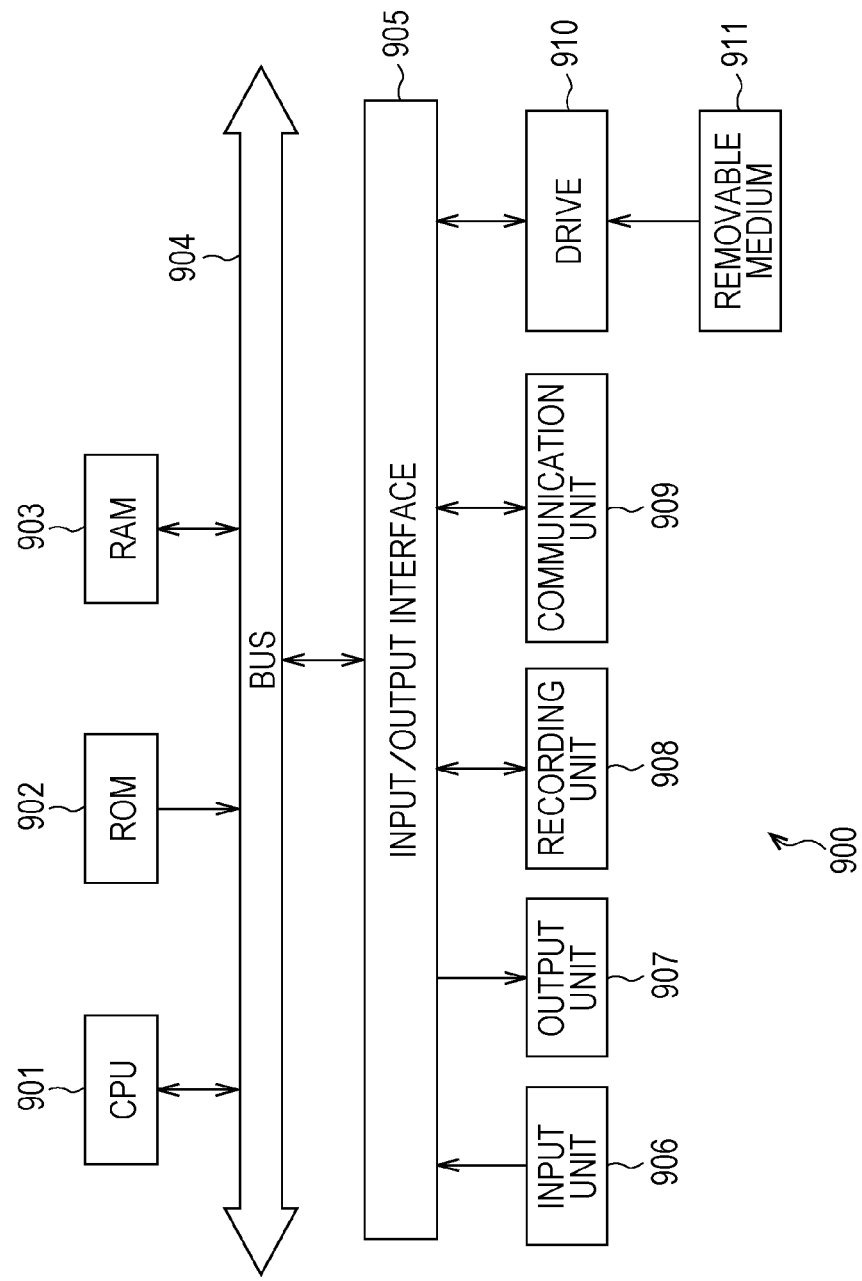
FIG. 21 is a drawing illustrating an exemplary configuration of a computer.

FIG. 21 is a block diagram illustrating an exemplary configuration of hardware of a computer which executes a series of processing described above by programs.

In a computer 900, a CPU (Central Processing Unit) 901, ROM (Read Only Memory) 902, and RAM (Random Access Memory) 903 are connected with one another via a bus 904.

The bus 904 is further connected with an input/output interface 905. To the input/output interface 905, an input unit 906, an output unit 907, a recording unit 908, a communication unit 909, and a drive 910 are connected.

The input unit 906 is configured of a keyboard, a mouse, a microphone, and the like. The output unit 907 is configured of a display, a speaker, and the like. The recording unit 908 is configured of a hard disk, nonvolatile memory, and the like. The communication unit 909 is configured of a network interface and the like. The drive 910 drives a removable medium 911 such as a magnetic disk, an optical disk, a magneto-optical disk, semiconductor memory, or the like.

In the computer 900 configured as described above, the CPU 901 loads a program, stored in the recording unit 908 for example, to the RAM 903 and executes it via the input/output interface 905 and the bus 904, whereby a series of processing described above is performed.

The program executed by the computer 900 (CPU 901) may be provided by being recorded on the removable medium 911 as a package medium, for example. The program may also be provided by a wired or wireless transmission medium such as a local area network, the Internet, or digital satellite broadcasting.

In the computer 900, a program may be installed in the recording unit 908 via the input/output interface 905, by installing the removable medium 911 in the drive 910. Further, a program may be received by the communication unit 909 and installed in the recording unit 908 via a wired or wireless transmission medium. Besides, a program may be preinstalled in the ROM 902 or the recording unit 908.

It should be noted that a program to be executed by the computer 900 may be a program in which processing is performed in a time-series manner along with the sequence described in the present description, or a program in which processing is performed in parallel or at necessary timing such as when a call is made.

Here, in the present description, a processing step of describing a program for allowing the computer 900 to perform various types of processing does not necessarily perform processing in a time-series manner along with the sequence described as a flowchart, and includes processing performed in parallel or individually (for example, parallel processing or processing by an object).

Further, a program may be one processed by one computer or one processed in a distributed manner by a plurality of computers. Furthermore, a program may be one which is transferred to a remote computer and executed.

Further, in the present description, system means a set of constituent elements (devices, modules (components) and the like), regardless of all constituent elements being in the same casing. As such, system includes both a plurality of devices accommodated in separate casings and are connected over a network, and one device in which a plurality of modules are accommodated in one casing.

It should be noted that embodiments of the present technology are not limited to the embodiments described above, and may be changed in various manners within the scope not deviating from the gist of the present technology.

For example, the present technology may take a configuration of crowd computing in which one function is executed by being shared by a plurality of devices over a network.

Further, the respective steps described in the flowchart described above may be performed by one device or performed by being shared by a plurality of devices.

Further, if a plurality of units of processing is included in one step, the units of processing included in the one step may be performed by one device or performed by being shared by a plurality of devices.

It should be noted that the present technology may take the following configurations.

(1)

A receiving device including:

a receiving unit that receives AV content;

a mapping information acquisition unit that acquires mapping information in which a first directory structure and a second directory structure are associated with each other, the first directory structure being used in a case of transmitting, by a first transmission system, a resource constituting an application program executed in conjunction with the AV content, the second directory structure being used in a case of transmitting a resource constituting the application program by a second transmission system; and an application acquisition unit that, when the application program including a resource created in accordance with the first directory structure is transmitted by the second transmission system, allows the resource created in accordance with the first directory structure to correspond to the second directory structure using the mapping information to thereby acquire the application program transmitted by the second transmission system.

(2)

The receiving device according to (1), wherein the mapping information is included in control information for controlling operation of the application program, the receiving device further including a control unit that controls the operation of the application program based on the control information.

(3)

The receiving device according to (1) or (2), wherein the first transmission system is transmission by communications using the Internet, the first directory structure has a hierarchical structure used in a production environment of an application program for transmission by communications, the second transmission system is transmission by broadcasting using data carousel transmission, and the second directory structure has a hierarchical structure used in a production environment of an application program for transmission by broadcasting.

(4)

The receiving device according to (3), wherein in the first directory structure, a resource is designated by a relative path which is relative to a particular path, and the mapping information associates the resource designated by the relative path with a resource stored in a module used in data carousel transmission.

(5)

The receiving device according to (4), wherein when the application acquisition unit allows a resource created in accordance with the first directory structure to correspond to the second directory structure using the mapping information, when there are resources of the same name, the application acquisition unit preferentially selects a resource stored in a module being referred to.

(6)

The receiving device according to any one of (3) to (5), wherein the application acquisition unit acquires the application program to be transmitted by a transmission system of either communications or broadcasting, in accordance with information representing a transmission system included in the control information.

(7)

The receiving device according to any one of (3) to (6), wherein the control information is transmitted by a transmission system of either communications or broadcasting.

(8)

The receiving device according to any one of (2) to (7), wherein when the application program including a resource created in accordance with the second directory structure is transmitted by the second transmission system, the application acquisition unit acquires the application program transmitted by the second transmission system without using the mapping information.

(9)

A receiving method of a receiving device, the method including the steps of, by the receiving device:

receiving AV content;

acquiring mapping information in which a first directory structure and a second directory structure are associated with each other, the first directory structure being used in a case of transmitting, by a first transmission system, a resource constituting an application program executed in conjunction with the AV content, the second directory structure being used in a case of transmitting a resource constituting the application program by a second transmission system; and when the application program including a resource created in accordance with the first directory structure is transmitted by the second transmission system, allowing the resource created in accordance with the first directory structure to correspond to the second directory structure using the mapping information to thereby acquire the application program transmitted by the second transmission system.

(10)

A program causing a computer to function as:

a receiving unit that receives AV content;

a mapping information acquisition unit that acquires mapping information in which a first directory structure and a second directory structure are associated with each other, the first directory structure being used in a case of transmitting, by a first transmission system, a resource constituting an application program executed in conjunction with the AV content, the second directory structure being used in a case of transmitting a resource constituting the application program by a second transmission system; and an application acquisition unit that, when the application program including a resource created in accordance with the first directory structure is transmitted by the second transmission system, allows the resource created in accordance with the first directory structure to correspond to the second directory structure using the mapping information to thereby acquire the application program transmitted by the second transmission system.

(11)

A transmission device including:

a generation unit that generates control information for controlling operation of an application program executed in conjunction with AV content; and a transmission unit that transmits the control information along with the AV content, wherein the control information includes mapping information in which a first directory structure to be used in a case of transmitting a resource constituting the application program by a first transmission system, and a second directory structure to be used in a case of transmitting a resource constituting the application program by a second transmission system, are associated with each other.

(12)

A transmission method of a transmission device, the method including the steps of, by the transmission device:

generating control information for controlling operation of an application program executed in conjunction with AV content; and transmitting the control information along with the AV content, wherein the control information includes mapping information in which a first directory structure to be used in a case of transmitting a resource constituting the application program by a first transmission system, and a second directory structure to be used in a case of transmitting a resource constituting the application program by a second transmission system, are associated with each other.

(13)

A program causing a computer to function as:

a generation unit that generates control information for controlling operation of an application program executed in conjunction with AV content; and a transmission unit that transmits the control information along with the AV content, wherein the control information includes mapping information in which a first directory structure to be used in a case of transmitting a resource constituting the application program by a first transmission system, and a second directory structure to be used in a case of transmitting a resource constituting the application program by a second transmission system, are associated with each other.

REFERENCE SIGNS LIST 1, 2 Broadcast/communication cooperation system
10 Transmission device
20 Receiving device
30 Application server
40 XML-AIT server
90 Internet
201 Control unit
212 Tuner
221 Carousel processing unit
222 Data broadcast application control unit
223 AIT acquisition and analysis unit
224 Web application control unit
225 Communication I/F
220 Display
900 Computer
901 CPU

The invention claimed is:

1. A receiving device comprising:

receiving circuitry configured to receive audio and video (AV) content, an application program to be executed in conjunction with the AV content, and mapping information, the mapping information associating a first path of a resource of the application program designated using a first directory structure with a second path of the resource of the application program designated using a second directory structure different from the first directory structure; and processing circuitry configured to control an operation of the application program, the processing circuitry is further configured to, in case of the resource of the application program being received using the second directory structure and in case of the application program referring to the resource of the application program using the first directory structure:

identify the second path that is associated with the first path using the mapping information; and acquire the resource of the application program for the operation of the application program using the second path, wherein the processing circuitry is further configured to, in case of the mapping information indicating that at least two paths are designated to the resource of the application program using the second directory structure, identify one of the at least two paths that refers to a target module associated with the application program as the second path.

2. The receiving device according to claim 1, wherein the mapping information is included in control information for controlling the operation of the application program, and the processing circuitry is configured to control the operation of the application program based on the control information.

3. The receiving device according to claim 2, wherein the resource of the application program is received using the first directory structure in case of the resource of the application program being received by communications using a data network, and the resource of the application program is received using the second directory structure in case of the resource the application program being received by broadcasting.

4. The receiving device according to claim 3, wherein the second path of the resource of the application program is designated based on a module used in data carousel transmission for transmitting the resource.

5. The receiving device according to claim 1, wherein the receiving circuitry is configured to acquire the application program through either communications or broadcasting, in accordance with information representing a transmission, system for transmitting the application program included in control information for controlling the operation of the application program.

6. The receiving device according to claim 1, wherein the receiving circuitry is configured to receive control information that is transmitted by a transmission system using either communications or broadcasting, the control information being for controlling the operation of the application program.

7. The receiving device according to claim 1, wherein the processing circuitry is further configured to, in case of the resource of the application program being received using the second directory structure and in case of the application program referring to the resource of the application program using the second directory structure, acquire the resource of the application program for the operation of the application program without using the mapping information.

8. The receiving device according to claim 1, wherein the receiving device is a television receiver.

9. The receiving device according to claim 1, wherein the resource of the application program comprises a document file or an image file.

10. A receiving method of a receiving device, the method comprising:

receiving, by receiving circuitry of the receiving device, audio and video (AV) content, an application program to be executed in conjunction with the AV content, and mapping information, the mapping information associating a first path of a resource of the application program designated using a first directory structure with a second path of the resource of the application program designated using a second directory structure different from the first directory structure; and controlling, by processing circuitry of the receiving device, an operation of the application program, including, in case of the resource of the application program being received using the second directory structure and in case of the application program referring to the resource of the application program using the first directory structure:

identifying the second path that is associated with the first path using the mapping information, including, in case of the mapping information indicating that at least two paths are designated to the resource of the application program using the second directory structure, identifying one of the at least two paths that refers to a target module associated with the application program as the second path; and acquiring the resource of the application program for the operation of the application program using the second path.

11. The receiving method according to claim 10, further comprising:

receiving control information for controlling the operation of the application program; and controlling, by the processing circuitry of the receiving device, the operation of the application program based on the control information.

12. The receiving method according to claim 10, further comprising:

receiving the resource of the application program by broadcasting using data carousel transmission, wherein the second path of the resource of the application program is designated based on a module used in the data carousel transmission for transmitting the resource.

13. The receiving method according to claim 10, further comprising receiving control information for controlling the operation of the application program; and acquiring, the application program through either communications or broadcasting, in accordance with information representing a transmission system for transmitting the application program included in the control information for controlling the operation of the application program.

14. The receiving method according to claim 10, further comprising:

receiving control information that is transmitted by a transmission system using either communications or broadcasting, the control information being for controlling the operation of the application program.

15. The receiving method according to claim 10, further comprising:

in case of the resource of the application program being received using the second directory structure and in case of the application program referring to the resource of the application program using the second directory structure, acquiring the resource of the application program for the operation of the application program without using the mapping information.

16. A non-transitory storage medium stored therein a program which, when being executed by a computer, causes the computer to perform a method comprising:
receiving audio and video (AV) content, an application program to be executed in conjunction with the AV content, and mapping information, the mapping information associating a first path of a resource of the application program designated using a first directory structure with a second path of the resource of the application program designated using a second directory structure different from the first directory structure; and
controlling an operation of the application program, including, in case of the resource of the application program being received using the second directory structure and in case of the application program referring to the resource of the application program using the first directory structure:
identifying the second path that is associated with the first path using the mapping information, including, in case of the mapping information indicating that at least two paths are designated to the resource of the application program using the second directory structure, identifying one of the at least two paths that refers to a target module associated with the application program as the second path; and
acquiring the resource of the application program for the operation of the application program using the second path.

17. A transmission device comprising:
processing circuitry configured to generate control information for controlling an operation of an application program to be executed in conjunction with audio and video (AV) content; and
transmitting circuitry configured to
transmit the control information along with the AV content, and
transmit a resource of the application program using data carousel transmission, wherein
the control information includes mapping information associating a first path of the resource of the application program designated using a first directory structure with a second path of the resource of the application program designated using a second directory structure different from the first directory structure,
wherein the second path of the resource of the application program is designated based on a module used in the data carousel transmission for transmitting the resource.

18. A transmission method of a transmission device, the method comprising:
generating, by processing circuitry of the transmission device, control information for controlling an operation of an application program to be executed in conjunction with audio and video (AV) content;
transmitting, by transmitting circuitry of the transmission device, the control information along with the AV content; and
transmitting, by the transmitting circuitry of the transmission device, a resource of the application program using data carousel transmission, wherein
the control information includes mapping information associating a first path of the resource of the application program designated using a first directory structure with a second path of the resource of the application program designated using a second directory structure different from the first directory structure,
wherein the second path of the resource of the application program is designated based on a module used in the data carousel transmission for transmitting the resource.

19. A non-transitory storage medium stored therein a program which, when being executed by a computer, causes the computer to perform a method comprising:
generating control information for controlling an operation of an application program to be executed in conjunction with audio and video (AV) content;
transmitting the control information along with the AV content; and
transmitting a resource of the application program using data carousel transmission, wherein
the control information includes mapping information associating a first path of the resource of the application program designated using a first directory structure with a second path of the resource of the application program designated using a second directory structure different from the first directory structure,
wherein the second path of the resource of the application program is designated based on a module used in the data carousel transmission for transmitting the resource.

* * * * *